US010771566B2

(12) United States Patent
Jayaraman et al.

(10) Patent No.: US 10,771,566 B2
(45) Date of Patent: *Sep. 8, 2020

(54) DEVICE AND SYSTEM FOR CLOUD BASED MOBILE APPLICATION VIRTUALIZATION

(71) Applicant: SIERRAWARE, LLC, Sunnyvale, CA (US)

(72) Inventors: Gopal Jayaraman, Sunnyvale, CA (US); Gopu Subramanian, Chennai (IN)

(73) Assignee: SIERRAWARE, LLC, Sunnyvale, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 15/292,962

(22) Filed: Oct. 13, 2016

(65) Prior Publication Data

US 2018/0109624 A1    Apr. 19, 2018

(51) Int. Cl.
| | |
|---|---|
| *G06F 15/16* | (2006.01) |
| *H04L 29/08* | (2006.01) |
| *H04W 12/06* | (2009.01) |
| *H04W 12/00* | (2009.01) |

(52) U.S. Cl.
CPC ....... *H04L 67/141* (2013.01); *H04W 12/0027* (2019.01); *H04W 12/06* (2013.01); *H04L 67/10* (2013.01)

(58) Field of Classification Search
CPC ....... H04L 67/141; H04L 67/10; H04W 12/06
USPC ....................................................... 709/227
See application file for complete search history.

(56) References Cited

U.S. PATENT DOCUMENTS

| | | | |
|---|---|---|---|
| 9,444,912 B1 * | 9/2016 | Chen | H04L 69/08 |
| 9,813,509 B1 * | 11/2017 | Visser | H04L 67/16 |
| 2011/0282688 A1 | 11/2011 | Raggousis | |

(Continued)

OTHER PUBLICATIONS

R. Shacham, et al., "The virtual device: expanding wireless communication services through service discovery and session mobility," WiMob'2005), IEEE International Conference on Wireless and Mobile Computing, Networking and Communications, 2005., Montreal, Que., 2005, pp. 73-81 vol. 4 (Year: 2005).*

*Primary Examiner* — Taylor A Elfervig

(57) ABSTRACT

A system and method for mobile application virtualization. The system includes a server based architecture for mobile application virtualization. The architecture includes a single operating system instantiation resident on a server computer system. The single operating system includes a session management module and a plurality of service modules. The architecture further includes a plurality of user sessions each session comprising a plurality of applications and a unique session ID. The plurality of user sessions are operable to call services of the single operating system. The architecture further includes a plurality of virtual device sets each set comprising a unique session ID and associated with a respective user session of the plurality of user sessions. Upon receiving an application programming interface (API) call from an application of a first user session to a first service module of the plurality of service modules, the single operating system is operable to map the API call to a first set of virtual devices that shares a same session ID as a session ID of the first user session for fulfillment of the API call by the first service module.

18 Claims, 19 Drawing Sheets

100

(56) References Cited

U.S. PATENT DOCUMENTS

2013/0031478 A1 1/2013 Strober
2015/0081764 A1* 3/2015 Zhao .................. H04L 67/08
                                                709/203

* cited by examiner

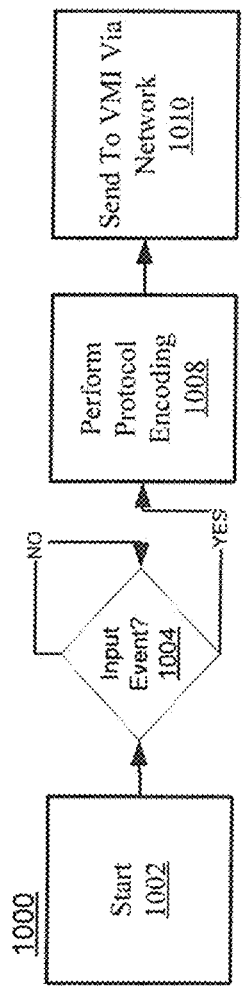
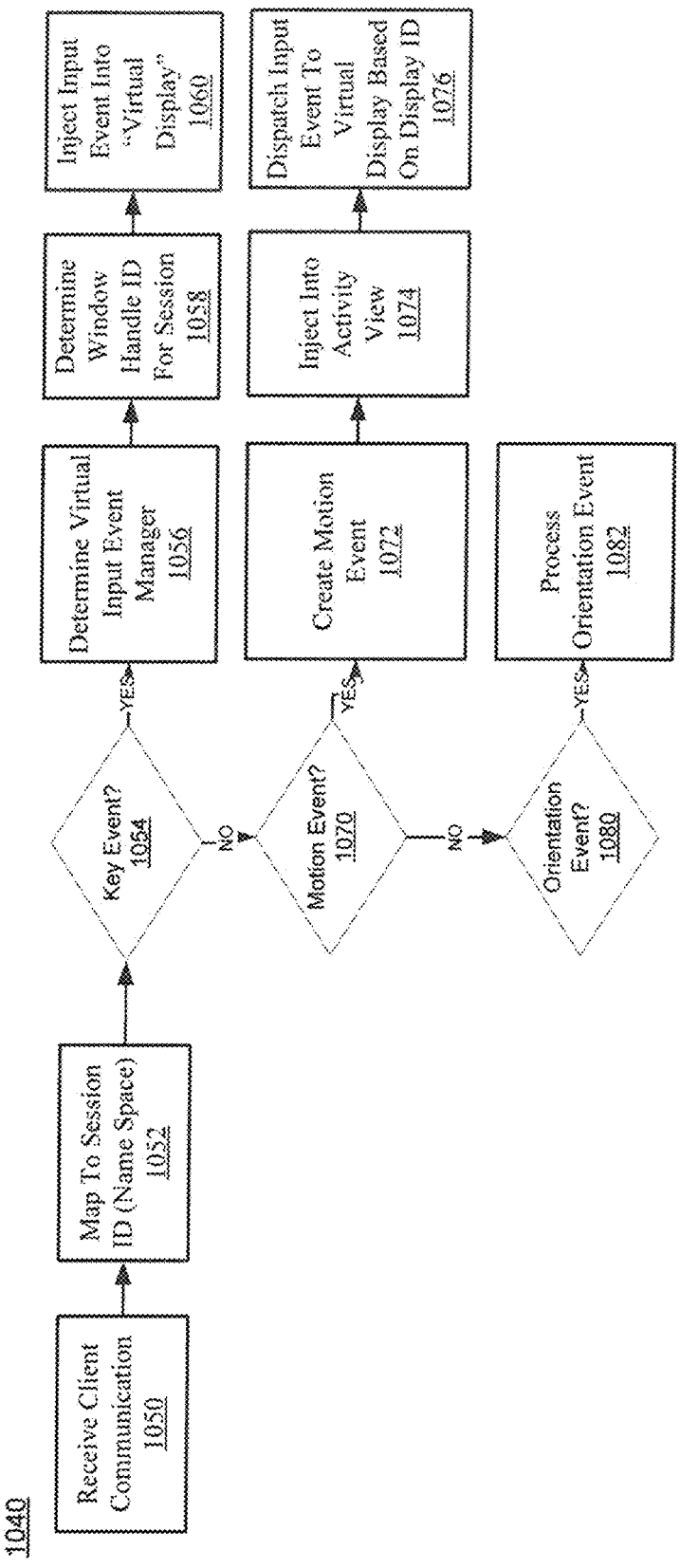
FIGURE 10A
FIGURE 10B

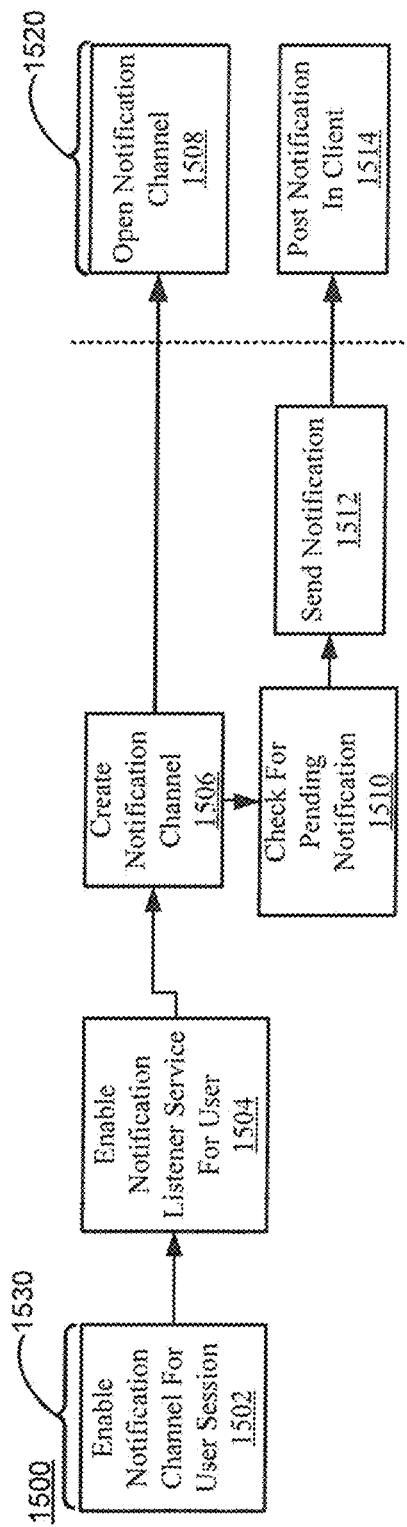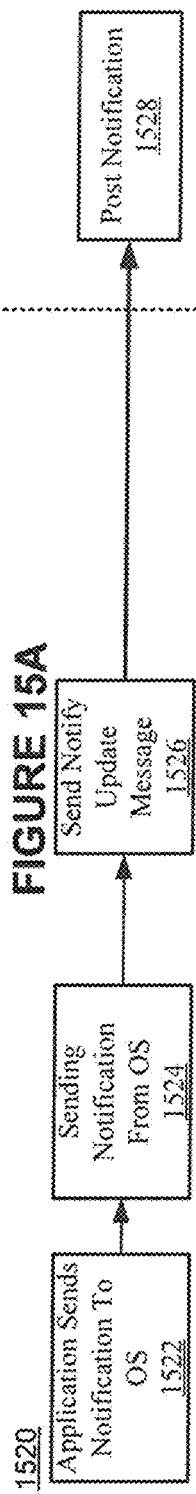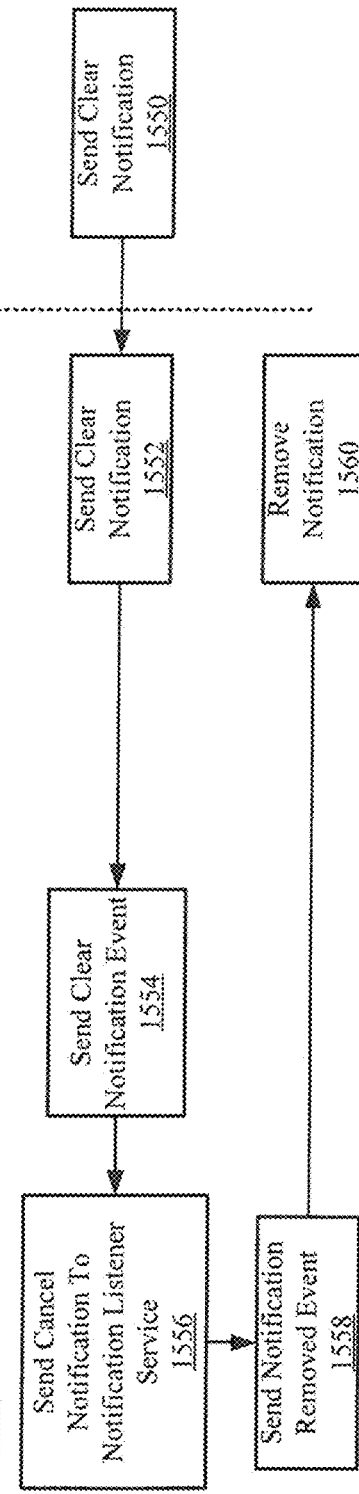
FIGURE 15A
FIGURE 15B
FIGURE 15C

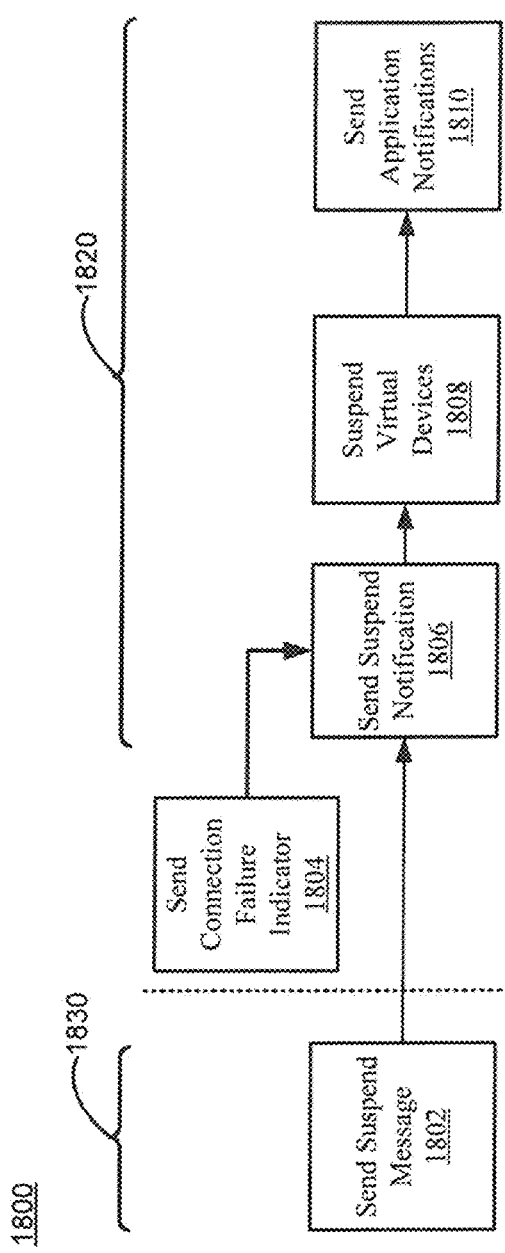
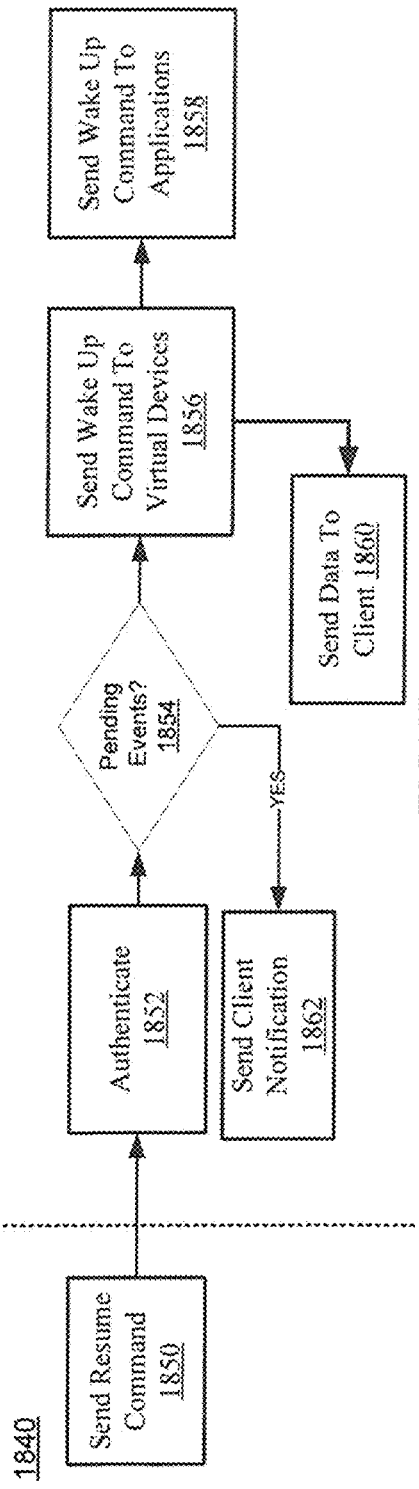
FIGURE 18A
FIGURE 18B

DEVICE AND SYSTEM FOR CLOUD BASED MOBILE APPLICATION VIRTUALIZATION

FIELD

Embodiments of the present invention are generally related to remote application execution and mobile application virtualization.

BACKGROUND

Enterprise mobility has revolutionized end user computing, enabling users to access business data at any time and from any location. It has increased productivity, provided field workers with Internet access, and accelerated the pace of digital transformation. However, it has also impacted how organizations deploy, manage, and secure enterprise applications. As a result of the changes generated by mobility, information technology (IT) administrators need to develop new ways to support a diverse array of devices, such as tablets and phones. Further, there is a need to find new ways to provision software and to protect end user devices, while yielding control to the employees who purchased their own devices.

Due to security and management challenges introduced by mobile devices, Virtual Mobile Infrastructure (VMI) has emerged. VMI allows organizations to host Android apps on servers in a data center or cloud environment and allows users to securely access the apps from their own phone or tablet. VMI is similar to Virtual Desktop Infrastructure (VDI), except the instead of virtualizing a traditional Windows or Linux desktop operating system, VMI virtualizes a mobile operating system, such as Android. VMI enables organizations to develop apps once and support any mobile device, centralize mobile app management, monitor user activity for unauthorized access or data exfiltration, and enforce strong authentication and encryption.

A problem in existing VMI architectures is they support only one user per mobile OS instance. Therefore, this approach does not provide adequate scalability or performance required to support thousands or tens of thousands of concurrent users due to the extreme computing resource demands of the VMI architecture. The expense to host a unique Android VM or LXC Container for every user in the cloud (OS virtualization) would be excessive. This is because most cloud providers charge for every VM instance. Large VMs with bigger RAM resources are also prohibitively expensive. If an organization has one thousand concurrent users, they would need to pay for a large number of VMs. Managing VMs in a corporate data center would be equally expensive; organizations would incur higher IT management and capital costs. In addition, hosting a separate VM per user would necessitate high performance storage hardware, similar to what VDI customers must purchase today. A better approach is needed.

SUMMARY OF THE INVENTION

Accordingly, what is needed is a solution to support a diverse array of devices, provisioning of software, and protecting end user devices from data loss. In accordance with embodiments of the present invention, mobile app virtualization is implemented and described herein. Using mobile app virtualization, organizations can run multiple, isolated and secure app instances on a single operating system instance. Each user's data is stored separately, ensuring that users can save their settings and access them later.

In one embodiment, mobile app virtualization provides performance gains and increased app density by adding multi-user extensions to the operating system, e.g., Android. Because mobile app virtualization does not need to run a separate operating system VM or container per user, it delivers much better density compared to full OS virtualization. As a result, mobile app virtualization reduces the number of servers needed to host VMI, it lowers hardware and operating costs, and it streamlines management. Embodiments of the present invention virtualize mobile applications to support multiple concurrent VMI users from a single Operating System (e.g., Android). Embodiments provide a method to isolate individual app instances with secure, firewalled sessions to ensure that no user can gain access to the other's data.

Embodiments include systems and methods for virtualizing individual user sessions for a mobile operating system to improve application performance, increase the number of users that can be hosted on a single server, and streamline management. Embodiments enable a single operating system instance (e.g., Android operating system) to serve multiple concurrent users, each with their own unique user profiles, and various devices, e.g., a camera, and file storage. With mobile application virtualization, clients can access remote applications hosted in the cloud or in a data center easily and efficiently. Embodiments thus provide unprecedented performance and application density by adding multi-user extensions to mobile operating systems (e.g., that are executed on a server).

In one embodiment, the present invention is directed to a server based architecture for mobile application virtualization. The architecture includes a single operating system instantiation resident on a server computer system. The single operating system includes a session management module and a plurality of service modules. The architecture further includes a plurality of user sessions each session comprising a plurality of applications and a unique session ID. The plurality of user sessions are operable to call services of the single operating system. The architecture further includes a plurality of virtual device sets each set comprising a unique session ID and associated with a respective user session of the plurality of user sessions. Upon receiving an application programming interface (API) call from an application of a first user session to a first service module of the plurality of service modules, the single operating system is operable to map the API call to a first set of virtual devices that shares a same session ID as a session ID of the first user session for fulfillment of the API call by the first service module.

In some embodiments, each user session of the plurality of user sessions is associated with a respective set of virtual devices of the plurality of virtual devices and wherein further each user session, and its associated set of virtual devices, are associated with a respective remote mobile computing system for enabling a virtualized computing experience thereon. In various embodiments, the architecture further comprises a communication gateway for routing information to and from the plurality of user sessions with respect to associated remote mobile computer systems. In some embodiments, the session management module comprises a mapping of each user session with a respective set of virtual devices associated therewith and wherein further the mapping is based on session IDs. In various embodiments, the session management module is further operable to route information from a first set of virtual devices to its associated user session based on a session ID of the first set of virtual devices. In some embodiments, the single operating system comprises a module for: receiving an API call from an application of a first user session, where The API call is for a first service module of the plurality of service modules; determining a session ID of the first user session; appending the session ID to the API call to create an appended API call; and forwarding the appended API call to the first service module. In various embodiments, the session management module determines a first set of virtual devices for use in fulfillment of the API call by the first service module, the session management module determining the first set of virtual devices based on the session ID of the appended API call.

In another embodiment, the present invention is implemented as a server based architecture for mobile application virtualization. The architecture includes a single operating system instantiation resident on a server computer system. The single operating system comprising a session management module and a plurality of service modules. The architecture further includes a plurality of user sessions each session comprising a plurality of applications and a unique session ID. The plurality of user sessions are operable to call services of the single operating system. The architecture further includes a plurality of virtual device sets each set comprising a unique session ID and associated with a respective user session of the plurality of user sessions. The architecture further includes a network module associated with the single operating system. Upon receiving a request from a network, the network module is operable to send the request to a virtual device of a first set of virtual devices that shares a same session ID as a session ID associated with the request.

In some embodiments, a service module of the plurality of service modules is configured to receive the request from the virtual device of the first set of virtual devices. The service module is further configured to determine an application associated with the session ID associated with the request and send the request to an application of a first user session based on the session ID. In various embodiments, each user session of the plurality of user sessions is associated with a respective set of virtual devices of the plurality of virtual devices. Each user session, and its associated set of virtual devices, are associated with a respective remote mobile computing system for enabling a virtualized computing experience thereon. In some embodiments, the architecture further includes a communication gateway for routing information to and from the plurality of user sessions with respect to associated remote mobile computer systems. In various embodiments, the session management module comprises a mapping of each user session with a respective set of virtual devices associated therewith and wherein further the mapping is based on session IDs. In some embodiments, the session management module is further operable to route information from a first set of virtual devices to its associated user session based on a session ID of the first set of virtual devices. In various embodiments, the single operating system comprises a module for: receiving an API call from an application of a first user session, where the API call for a first service module of the plurality of service modules; determining a session ID of the first user session; appending the session ID to the API call to create an appended API call; and forwarding the appended API call to the first service module. In some embodiments, the session management module determines a first set of virtual devices for use in fulfillment of the API call by the first service module, the session management module determining the first set of virtual devices based on the session ID of the appended API call.

In one embodiment, the present invention is directed toward a system for communicating with a mobile device. The system includes a session module configured to create a plurality of sessions for supporting a plurality of remote mobile devices simultaneously. Each session comprises a plurality of applications and a unique session ID, and wherein the service module is further configured to allocate server resources to each session. The system further includes a virtual device module configured to create a plurality of virtual device sets. Each virtual device set is associated with a respective session of the plurality of sessions. The system further includes a launcher module configured to launch an application of the plurality of applications. The application executes within a session of the plurality of sessions. The system further includes a service module configured to receive a request from the application. The service module is further configured to send the request to a virtual device of the plurality of virtual device sets based on the session ID. A single operating system instantiation comprises the service module, and the service module is configured to route requests between the plurality of applications and the plurality of virtual device sets. The system further includes a network module configured to receive the request from the virtual device and configured to send the request to a network.

In some embodiments, the request is an application programming interface (API) call. In various embodiments, the network module is further configured to send the request to a mobile device. In some embodiments, the virtual device comprises a parameter associated with a physical device. In various embodiments, the virtual device comprises an interprocess communication (IPC) pipe.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 10A-B show example input event processing in accordance with various embodiments of the present invention.

FIGS. 15A-C show example notification processing in accordance with various embodiments of the present invention.

FIGS. 18A-B shows example suspend and resume functionality in accordance with various embodiments of the present invention.

DETAILED DESCRIPTION OF THE INVENTION

Figure 1:
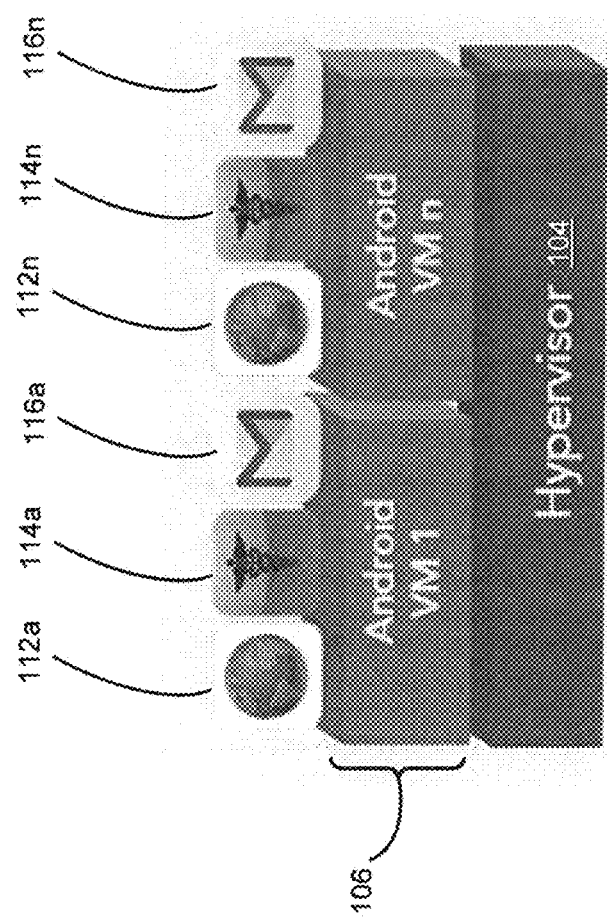
FIG. 1 shows a full operating system (OS) virtualization architecture.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "performing" or "executing" or "transforming" or "determining" or "launching" or "preparing" or "creating" or "installing" or "assigning" or "signaling" or "checking" or "receiving" or "sending" or "injecting" or "dispatching" or "mapping" or "encoding" or "capturing" or "enabling" or "opening" or "posting" or "removing" or "authenticating" or the like, refer to the action and processes of an integrated circuit (e.g., computing system 1900 of FIG. 19), or similar electronic computing device, that manipulates and transforms data represented as physical (electronic) quantities within the computer system's registers and memories into other data similarly represented as physical quantities within the computer system memories or registers or other such information storage, transmission or display devices.

Full Operating System Virtualization

As briefly described above, FIG. 1 shows a full operating system (OS) virtualization architecture of the prior art. FIG. 1 depicts example components in a full OS virtualization architecture 100. The architecture 100 includes hypervisor 104, operating system virtual machines (VMs) 106, and applications 112*a-n*, 114*a-n*, and 116*a-n*. The hypervisor 104 creates and launches the virtual machine operating systems or guest operating systems 106 and presents the guest operating systems 106 with a virtual operating platform and manages the execution of the guest operating systems 106. The guest operating systems 106 may be one or more complete copies of an operating system and consume significant resources for each user.

The exemplary applications 112*a-n*, 114*a-n*, and 116*a-n* execute on top of the guest operating systems 106. The applications 112*a-n* are instances of a web browsing application, the applications 114*a-n* are instances of a medical application, and the applications 116*a-n* are instances of an email application.

System 100 offers several significant drawbacks and disadvantages. The cost to host a unique operating system VM for each user in the cloud, as required by OS virtualization using LXC Containers or Hypervisors, as described above is excessive. This is because most cloud providers charge for each VM instance and size of the instance. For example, if an organization has one thousand concurrent users, the organization would need to pay for several large size VMs. Managing VMs in a corporate data center would be similarly expensive and the organization would incur higher IT management and capital costs. Plus, hosting many VMs would necessitate high-performance storage hardware which is similar to what Virtual Desktop Infrastructure (VDI) customers need to purchase in conventional systems offered today.

Systems and Methods for Mobile Application Virtualization in Accordance with Embodiments of the Present Invention Embodiments of the present invention include systems and methods for virtualizing individual user sessions for a mobile operating system to improve application performance, increase the number of users that can be hosted on a single server, and streamline management. Embodiments enable a single operating system instance (e.g., Android operating system) to serve multiple concurrent users, each with their own unique user profiles, and various devices, e.g., a camera, and file storage. With mobile application virtualization, clients can access remote applications hosted in the cloud or in a data center easily and efficiently. Embodiments thus provide unprecedented performance and application density by adding multi-user extensions to mobile operating systems (e.g., that are executed on a server). These advantages provide for greater scalability.

The security and management challenges introduced by mobile devices and the Bring Your Own Device (BYOD) trend has paved the way for another trend, that was briefly described above, called Virtual Mobile Infrastructure (VMI). VMI allows organizations to host applications (e.g., Android applications) on servers in a data center or a cloud environment and allow users to securely access the applications from their own phone or tablet. VMI is similar to Virtual Desktop Infrastructure (VDI), except that instead of virtualizing a traditional Windows or Linux desktop operating system, VMI virtualizes a mobile operating system such as Android.

VMI further enables organizations to develop an application once and support any mobile device, centralize mobile application management, monitor user activity for unauthorized access or data exfiltration, and enforce strong authentication and encryption.

Unfortunately, early VMI architectures supported only one user per mobile OS instance and could not provide the scalability or performance needed to support thousands of tens of thousands of concurrent users. With mobile application virtualization, as described herein, organizations can run multiple, isolated, and secure application instances on a single operating system, e.g., Android. Each user's data is stored separately, ensuring that users can save their settings and access them later.

In addition to relying on full OS virtualization, many previous VMI products use Quick Emulator (QEMU) emulation to host Android instances. QEMU is an emulation tool that is useful developers to test Android on Intel servers, for instance. Unfortunately, using QEMU emulation limits VM density and it also makes it much more difficult to take advantage of server features like GPU acceleration. Mobile application virtualization offers immense advantages compared to full Android stack virtualization either using a QEMU emulation on top of hypervisors, or Linux Containers (LXC) style containers. The advantages can include, but are not limited to: zero latency new session establishment, e.g., as there is no need to boot an operating system, very low server central processing unit (CPU) requirements and memory requirements. For example, an Android instance may need approximately 2 GB of RAM, while an Android application may need approximately 32 to 64 MB of RAM. The advantages further include the ability to avoid complex IT infrastructures like storage area network (SAN), network switches, VM IP address management due to a single server being able to serve a large number of users. The advantage can further include reduced hardware, operating, data center cooling, and space costs, due to mobile application virtualization delivering 10× to 20× greater application density per server.

It is appreciated that mobile application virtualization, in accordance with embodiments of the present invention, eliminates the challenges of full OS virtualization, increases the user density per server, and streamlines management. Rendering images inline and processing display data and input events within an operating system (e.g., the Android OS) using virtual devices, possible with mobile application virtualization, maximizes performance and density. Combining mobile application virtualization with secure containers ensures that each user session is isolated. Mobile application virtualization brings other benefits like accelerating application "boot up time" when users launch VMI sessions.

Due to embodiments of the present invention, mobile application virtualization, not needing to run a separate operating system virtual machine (VM) per user, embodiments of the present invention deliver much better density compared to full OS virtualization. As a result, mobile application virtualization advantageously reduces the number of servers needed to host VMI, it lowers hardware and operating costs, and it streamlines management.

In some embodiments, mobile applications are virtualized to support multiple concurrent VMI users from a single Android operating system. Of course, Android is presented as exemplary only. Embodiments of the present invention can be applied with any mobile operating system platform. Embodiments include a method to isolate individual application instances with secure, firewalled sessions to ensure that no user can gain access to other users' data.

With a standard mobile device, mobile applications run on an operating system which interacts with the hardware, such as the screen display and the microphone and the camera and the other devices, through device drivers.

A traditional VMI architecture virtualizes the entire operating system and platform by virtualizing physical devices, such as a display, a microphone, a camera, and transmitting and rendering them on a remote client. For example, a traditional VMI server would capture the output of emulated frame buffer device or display information and stream it to a remote phone.

With mobile application virtualization, mobile applications and the associated virtual devices of the session are paired in such a way that a remote user only has access to his or her applications and devices. Mobile application virtualization is advantageously transparent to the application, so the application interacts with devices in the same manner as it would if it were running on a traditional mobile device. VMI session management, according to various embodiments of the present invention, handles the remote redirection through APIs and redirects communications to virtual devices specific to a user session.

For example, normally a mobile application would send audio information directly to the mobile device speakers. With mobile application virtualization, the application sends audio information to a virtual speaker created for that specific session. It is appreciated that within the mobile operating system, namespaces and sessions are created to handle each user. More specifically, embodiments create a namespace and a context session for each user. When a user authenticates, the modified mobile operating system (e.g., supporting mobile application virtualization) then associates virtual devices, e.g., a virtual display, a virtual camera, a virtual microphone, a virtual printer, virtual speakers, etc., with the session context. Whenever an application is executed within a specific user context and whenever the application tries to access a physical device, the mobile operating system redirects the request to the virtual device mapped to the particular session. The mapping contains the namespace assignments to properly perform the re-direction. Embodiments further include various techniques for implementing virtual devices in an efficient manner rather than mimicking the exact physical devices that they are replacing.

The mobile application virtualization solution in accordance with embodiments of the present invention can run multiple sessions in parallel. Each user can have a different type of authentication (e.g., Lightweight Directory Access Protocol (LDAP), client certificate), as well as different applications and settings. The stored data for each user can be stored separately in a secure file system and access is restricted to an individual, specific user.

Various components may be described herein with respect to the Android operating system, available from Google, Inc., of Mountain View, Calif., however, as discussed above, other embodiments may use other operating systems including, but not limited to, iOS from Apple, Inc., of Cupertino, Calif., or the Windows Phone operating system, available from Microsoft, Inc., of Redmond, Wash. Any mobile operating system can be used.

Embodiments can further provide enhanced security against theft. With VMI, as described herein, data and applications are maintained on a server and if a client device is stolen, access by the client device to the server can be revoked. For example, in a hospital environment during a medical crisis, nurses and doctors can be distracted allowing a thief to steal a tablet computing device. Access from the stolen tablet computing device can be disabled on the VMI server, thereby protecting sensitive medical and patient records from the being compromised because sensitive information is not stored on the client device. That is, the applications and associated data are stored on the server side and thus even with a stolen device, the data can not be accessed without authentication information (e.g., user-id/password, dual factor pin, etc.).

Figure 2:
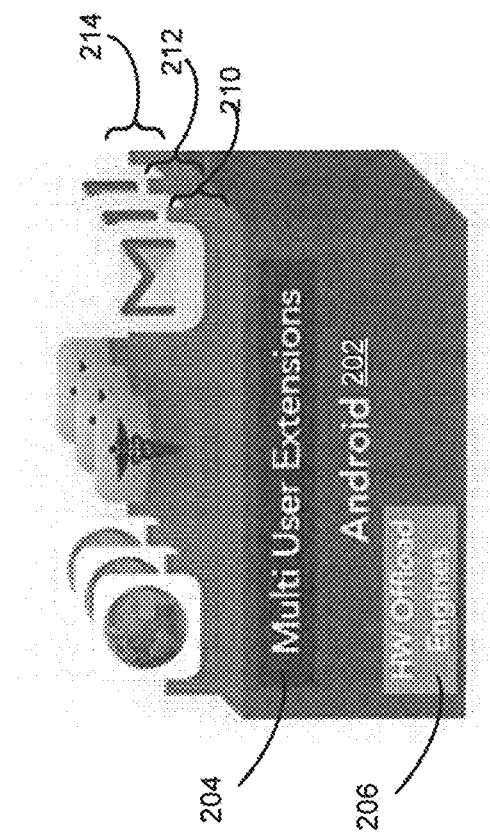
FIG. 2 shows an example mobile application virtualization architecture in accordance with various embodiments of the present invention.

FIG. 2 shows an example high level mobile application virtualization architecture in accordance with various embodiments. FIG. 2 depicts an exemplary mobile application virtualization architecture 200 with an example mobile operating system 202 (e.g., Android) with exemplary applications 210-214 executing on the mobile operating system 202. Only one instantiation of the operation system 202 is required.

The mobile operating system 202 includes multi-user extensions 204 and hardware (HW) offload engines 206. The multi-user extensions 204 enable multiple users to use the mobile operating system 202. For example, the multi-user extensions 204 can isolate individual application instances with secure, firewalled sessions to ensure that no user can gain access to other users' data. The multi-user extensions 204 may further allow the example mobile operating system 202 which is a mobile operating system designed for a single user to support multiple users.

The hardware (HW) offload engines 206 allow tasks or work to be offloaded onto hardware from the mobile operating system 202. For example, the HW offload engines 206 may enable graphics related tasks to be offloaded to a GPU.

The applications 210-214 can each include sets of applications for respective users. For example, the applications 210-214 can each include a web browser application, a medical application, and an email application for execution for a respective single user. Each user therefore uses its own respective instantiation of the application.

Figure 3:
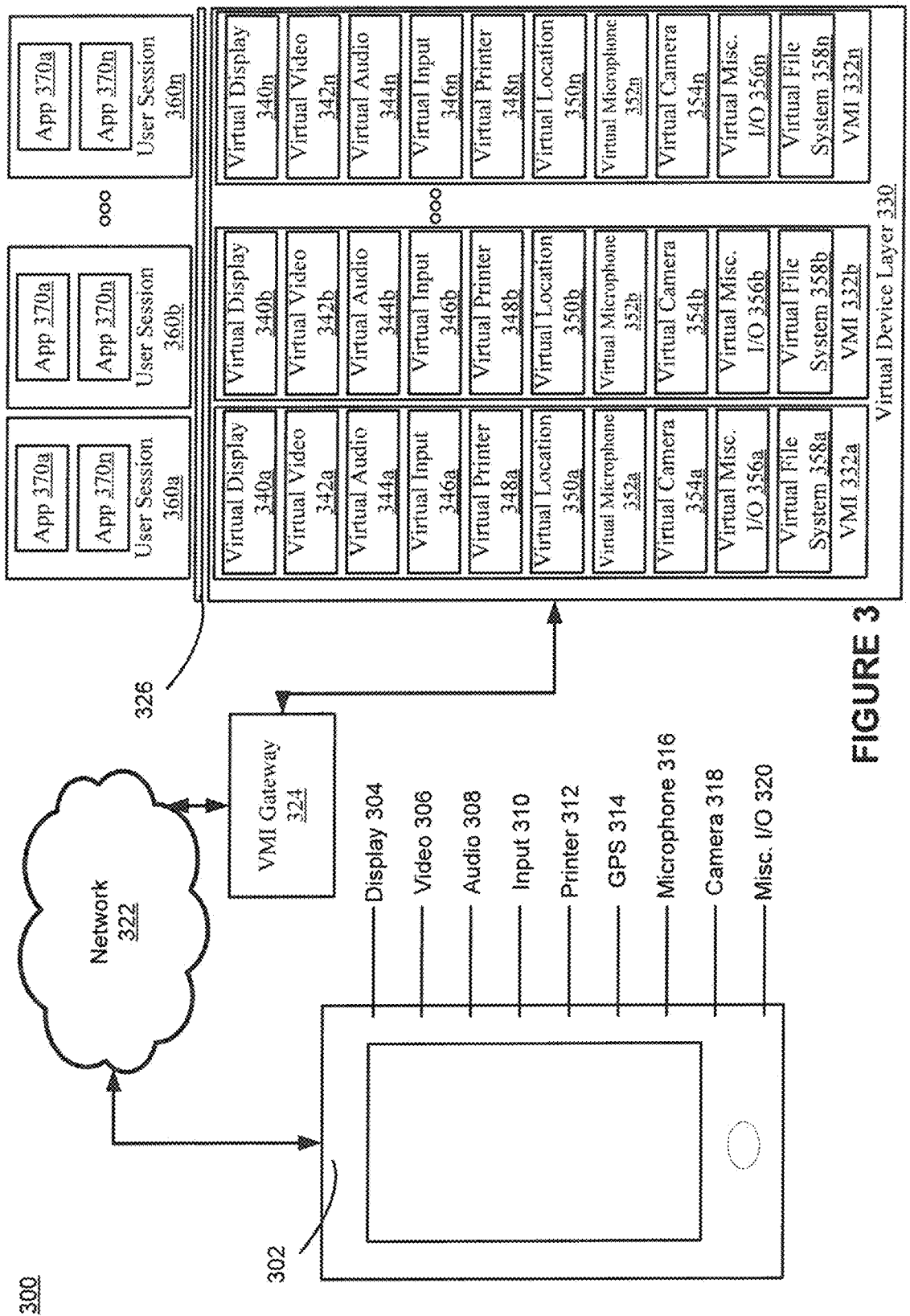
FIG. 3 shows an example network architecture for mobile application virtualization in accordance with various embodiments of the present invention.

FIG. 3 shows an example network architecture for mobile application virtualization in accordance with various embodiments. FIG. 3 depicts an end to end example network architecture 300 for mobile application virtualization.

The example network architecture 300 includes a client device 302 communicatively coupled via a network 322 and VMI gateway 324 to virtual device layer 330 which is server hosted. Device 302 may be a mobile computing device. The virtual device layer 330 is coupled to a single instantiation of an operating system 326 hosting a plurality applications 370a-n remotely for a plurality of users. FIG. 3 shows n separate sessions, 360a-360n, with each session having its own respective applications and its own respective namespace. The network 322 may be one or more communication networks including the Internet.

The client device 302 may be a variety of devices including, but not limited to, a tablet, a laptop, a smartphone, a computer, etc. The device 302 may include a display 304, a video processing component 306, an audio processing component 308, one or more input devices 310 (e.g., touch screen, mouse, or keyboard), a printer 312, a global position system component 314, a microphone 316, a camera 318, and miscellaneous input/output (I/O) 320 (e.g., device rotation or orientation change).

The VMI gateway 324 may be optional and can provide external authentication management and load balancing among mobile operating system servers. The VMI gateway is communicatively coupled to the virtual device layer 330. The virtual device layer 330 includes VMIs 332a-n. The VMIs 332a-n can isolate a set of virtual devices for each user session. Each VMI is associated with its own respective namespace.

The VMIs 332a-n include one or more sets of virtual devices 340a-n-358a-n each associated with a session (and a unique namespace). Each VMI can include a virtual display device, a virtual video device, a virtual audio device, a virtual input device, a virtual printer, a virtual location device, a virtual microphone, a virtual camera, a virtual miscellaneous I/O device, and a virtual file system device, etc. The virtual devices are mapped to their corresponding sessions via their namespaces and allow the instances applications 370a-n to execute as if the applications 370a-n were running locally on physical hardware (e.g., of the device 302). The applications 370a-n may thus be unmodified mobile applications that can execute on a device, e.g., the device 302, but within embodiments of the present invention execute instead in a particular user session of the mobile operating system 326. The applications 370a-n are associated with the virtual devices based on the user session (and namespace). For example, an instance of application 370a of the user session 360a is associated with the virtual devices of the VMI 332a based on the user session 360a.

In some embodiments, the virtual devices of a VMI can be customized based on the device, e.g., the device 302, associated with the session associated with the device. For example, if the VMI 332a is associated with the device 302, the virtual devices 340a-358a are configured based on the device properties of the device 302.

In some embodiments, the virtual devices are operating system pipes configured with device properties associated with a respective physical device (e.g., of the device 302). A virtual device can be configured to decompress data received via the network or a VMI network service or gateway and send the data to an application based on a user session associated with the application and the virtual device. A virtual device can be associated with memory that is configured for access by operating system API calls to send and receive data to and from an application. In some embodiments, a virtual device is an inter-process communication (IPC) pipe.

The mobile server operating system 326, as described above, is a single instantiation of the OS and is configured to host mobile applications remotely from the device 302. The mobile operating system 326 may be hardware independent and can be hosted as a virtual machine or directly installed on a physical server because application virtualization is self-contained within the mobile operating system 326 and is not dependent on the underlying platform. Underlying platform features, e.g., GPU and cryptographic accelerators, can be used to improve performance but are not needed to achieve the necessary functionality.

The single instantiation of the mobile operating system 326 allows multiple user session containers and user sessions to execute applications 370a-n within the user session containers. The user session containers isolate and protect the instances of applications 370a-n within a user session.

The user session 360a includes instances of applications 370a-n and is associated with VMI 332a, both sharing a same namespace. The instances of applications 370a-n of the user session 360a execute on top of the mobile operating system 326. Requests for hardware access from the instances of applications 370a-n of the user session 360a are sent to the virtual devices of VMI 332a by the operating system 326 via a mapping operation that matches the proper session (namespace).

As instances of applications 370a-n of the user session 360a execute on top of the mobile operating system 326, requests for hardware access are sent to the virtual devices of VMI 332a based on a common namespace between 360a and 332a. The user session 360b includes instances applications 370a-n and is associated with VMI 332b. The instances of applications 370a-n of the user session 360b execute on top of the mobile operating system 326. Requests for hardware access from the instances of application 370a-n of the user session 360b are sent to the virtual devices of VMI 332b by the server operating system 326 based on a common namespace between 360b and 332b.

The user session 360c includes instances of applications 370a-n and is associated with VMI 332c. The instances of applications 370a-n of the user session 360c execute on top of the mobile operating system 326. Requests for hardware access from the instances of application 370a-n of the user session 360c are sent to the virtual devices of VMI 332n by the operating system 326 based on a common namespace between 360c and 332c.

The mobile operating system 326 is thus able to support multiple user sessions and allows operations based on hardware access to be performed for the applications of each respective session through the use of virtual devices. The mobile operating system 326 is therefore responsible for routing communication to and from the paired user sessions 360 and VMIs 332 based on a mapping of common namespaces.

The virtual devices of the VMIs 332a-n may be customized based on the device associated with the VMI based on the device that is being used to login. For example, the virtual input device 346b for the VMI 332b associated with a laptop can be a virtual mouse and a virtual keyboard instead of a virtual touch input. In some embodiments, the virtual devices are configured with one or more properties of the associated device of the client device 302.

As another example, the virtual display device 340a may be configured with a resolution property, e.g., 1080p, which matches the resolution of the display 304 of the device 302. An instance of the application 370a of user session 360a can send a display resolution request to the operating system 326. The operating system 326 will then query the virtual display device 340a and receive a resolution indication of 1080p.

Figure 4:
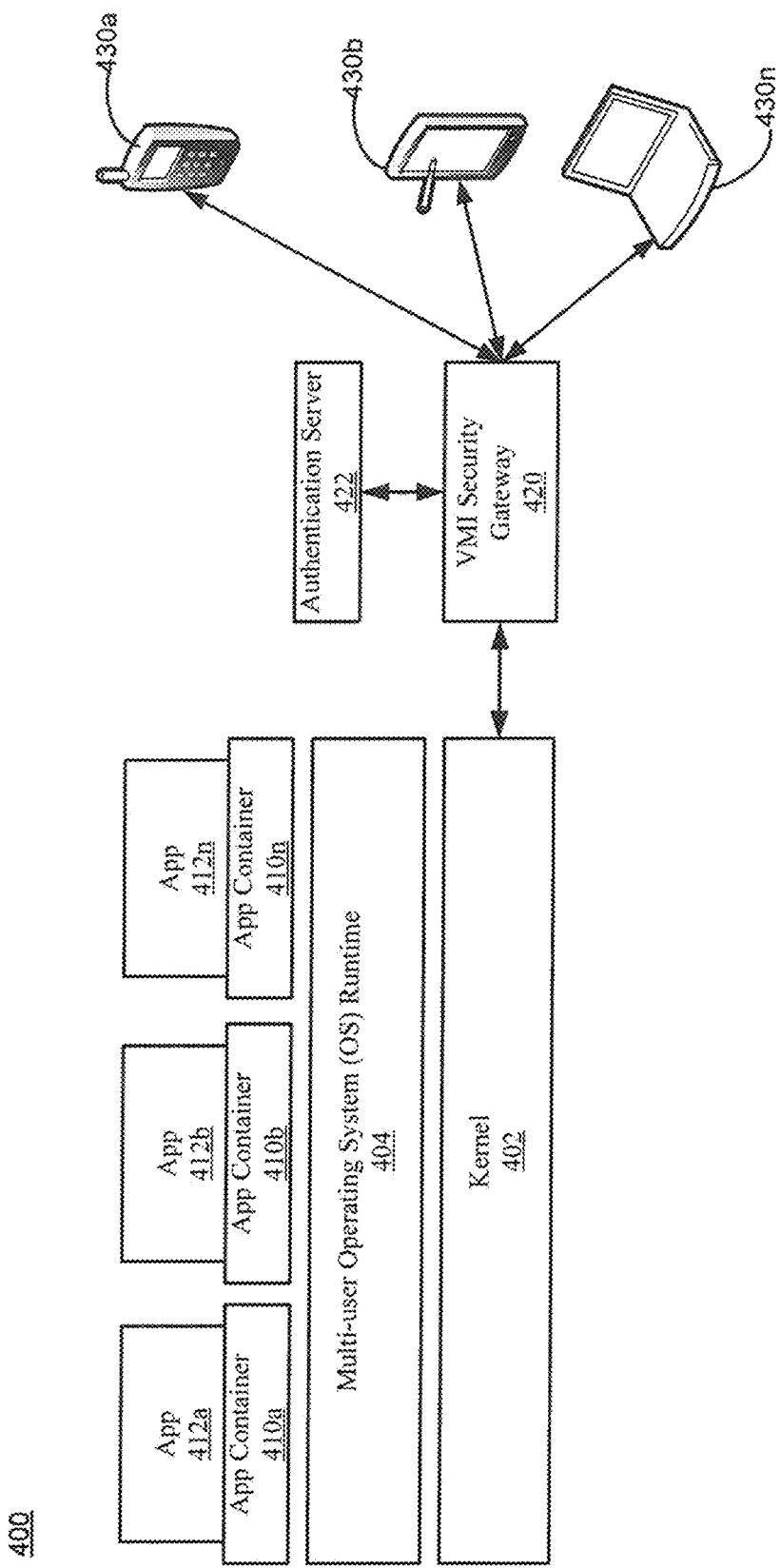
FIG. 4 shows a block diagram of multiple device accessing multiple hosted applications in accordance with various embodiments of the present invention.

FIG. 4 shows a block diagram of multiple devices accessing multiple hosted applications in accordance with various embodiments. FIG. 4 depicts how multiple users can access remotely hosted applications simultaneously. The example architecture 400 includes applications (apps) 412a-n, application containers 410a-n, multi-user operating system runtime, kernel 402, a VMI security gateway 420, an authentication server 422, and devices 430a-n. A single OS 404 is shown.

In some embodiments, the kernel 402 is a customized kernel of a mobile operating system that has been customized for execution of multiple applications in multiple user sessions. The multi-user OS runtime is a runtime of a mobile operating system that is customized for execution of multiple applications in multiple user sessions. Each of the applications 412a-n execute within respective application containers 410a-n on top of the single multi-user operating system runtime 404. The application containers 410a-n isolate the applications 412a-n from each other.

In some embodiments, the VMI security gateway 420 is configured to function as a SSL offload and generic communication pipe between the client and the VMI server. The VMI security gateway 420 can handle network communication of the devices 430a-n and the kernel 402. The VMI security gateway 420 further communicates with the authentication server 422 to allow user authentication of users logging in from the devices 430a-n. The authentication server 422 handles storage of user information and authentication of login requests from users of the devices 430a-n.

The device 430a-n are example devices that can execute a VMI client configured to provide local functionality for mobile application virtualization. In one embodiment, the device 430a is a smartphone, the device 430b is a tablet computing device, and the device 430n is a laptop computer. Any mobile device can be used. The end users of the devices 430a-n are able to simultaneously use the applications 412a-n.

Each user session can be customized based on the respective device associated with a session. Each application associated with a namespace (session) derives unique parameters based on the virtual devices associated with the session. The way applications are virtualized has no impact on other applications. The virtual devices associated with a session inherit similar physical parameters like resolution, printer queues, and location data based on the device features and capabilities. For example, the user session associated with the smartphone 430a will have a different screen resolution, input devices, and peripheral device, e.g., a camera and printer, from a user session associated with the laptop 430n.

Figure 5:
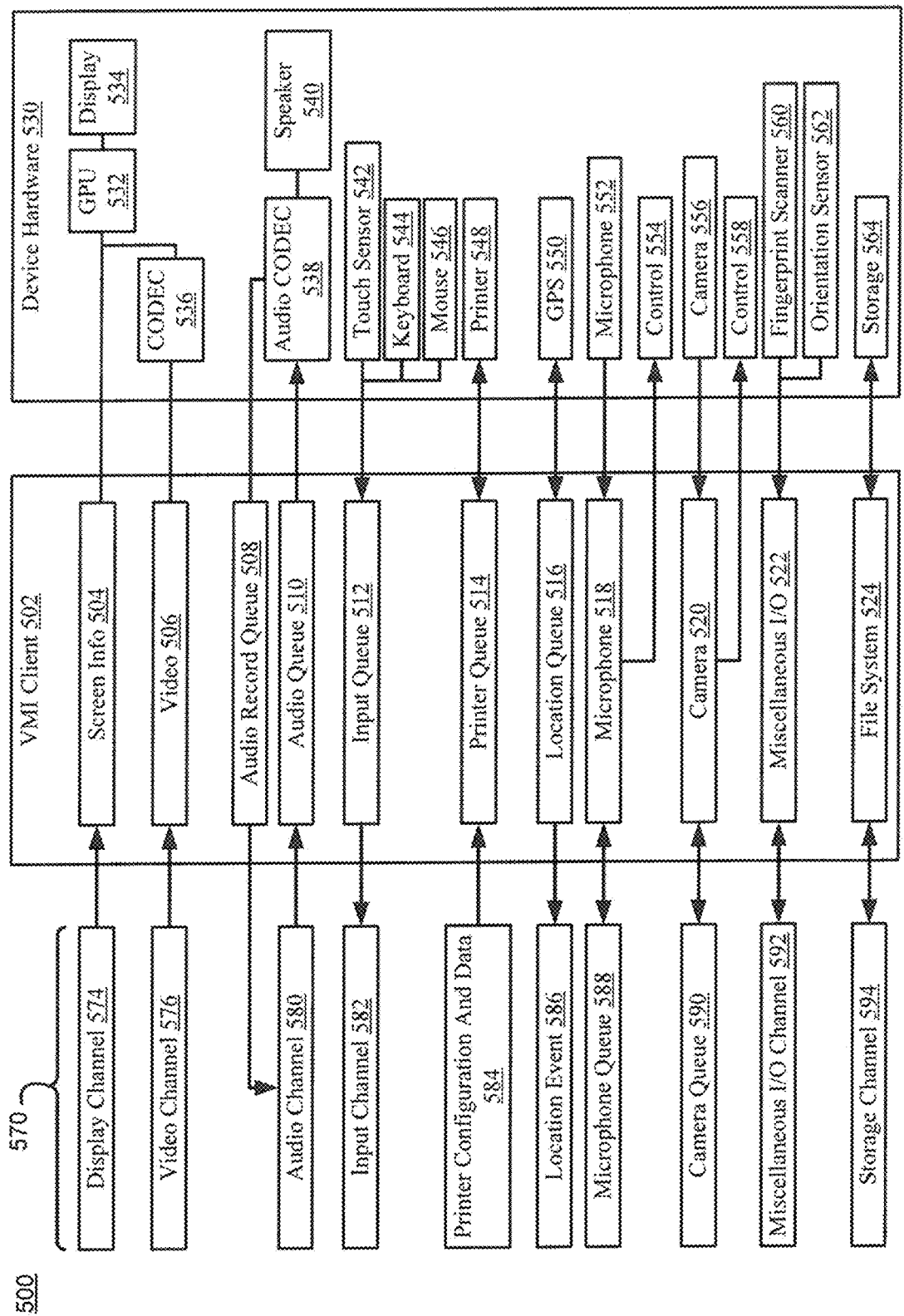
FIG. 5 shows example client and device components in accordance with various embodiments of the present invention.

FIG. 5 is drawn to show the client side components, e.g., the mobile device. In particular, FIG. 5 shows example client and device components in accordance with various embodiments. FIG. 5 depicts a diagram 500 of how a mobile application virtualization client can be implemented for interfacing with the server side mobile app virtualization architecture components. The diagram 500 includes communication channels 570, a VMI client 502, and device hardware 530. The VMI client 502 executes on a processor (not shown) of the device hardware 530 (e.g., the mobile device unit). The VMI client 502 can be a universal client that is configured to execute on a variety of hardware devices including, but not limited to, a smartphone, a tablet, a laptop or a desktop. The VMI client 502 can further handle the runtime operations to create the experience of an application running locally (on device 530) when the application is actually executing remotely on a server.

The communication channels 570 can include a display channel 574, a video channel 576, an audio channel 580, an input channel 582, a printer configuration and data channel 584, a location event channel 586, a microphone queue 588, a camera queue 590, miscellaneous I/O channel 592, and a storage channel 594. The communication channels 570 can be from a network and controlled by a VMI gateway server, e.g., VMI gateway 324. In some embodiments, the VMI client 502 analyzes the device hardware 530 to determine various properties of the device hardware 530 which are then sent to a server for creation of the communication channels 570. For example, if the VMI client 502 is executing on hardware that does not have a printer, then printer configuration and data channel 584 may not be created. The communication channels 570 can be mapped on the server side to virtual devices and applications associated with a namespace (e.g., FIG. 6).

The VMI client 502 includes a screen information component 504, a video component 506, an audio record queue 508, an audio queue 510, an input queue 512, a printer queue 514, a location queue 516, a microphone component 516, a camera component 520, a miscellaneous I/O component 522, and a file system component 524.

The device hardware 530 includes a GPU 532, a display 534, a coder-decoder (CODEC) 536, an audio CODEC 538, a speaker 540, a touch sensor 542, a keyboard 544, a mouse 546, a printer 548, a GPS 550, a microphone 552, a microphone control 554, a camera 556, a camera control component 558, a fingerprint scanner 560, and a storage component 562.

The VMI client 502 is configured to act as a front end allowing a user to interact with a remotely hosted application. In other words, VMI client 502 executes on the mobile device 530 in order to implement the client-side mobile app virtualization features in accordance with embodiments of the present invention. For example, display data is streamed from the remote server operating system over the display channel 574 to the screen information component 504. The screen information component 504 can process the data and send the display data to the GPU 532 which renders the display data for display by the display 534. The VMI client 502 thereby advantageously provides a user experience as though the remote application is running locally on the end user's client device (e.g., device hardware 530).

When the user interacts with the remotely hosted application via a touch or keyboard and mouse, the input events are received at the input queue 512, encoded, and sent over the network to be used by the mobile server operating system as virtual events from virtual input devices.

The VMI client 502 is further configured to function as a backend for the virtual devices of the mobile operating system server (e.g., the operating system 326). For example, when the user requests to print a document or picture from a remotely hosted application, the printer queue 514 and print stream data is presented to the actual physical printer connected locally to the printer 548, thereby allowing completion of the print request.

The device hardware 530 could be a mobile devices, e.g., an iOS or Android phone or tablet, or any device with a web browser (e.g., HTML5), such as a PC running Windows, Linux, or Chrome OS with a keyboard or mouse. The devices do not need to have a full set of peripherals enabled such as a printer, GPS, or camera. The VMI client 502 during initialization can configure the appropriate features based on the devices available in the device hardware 530. The VMI client 502 can be implemented using various programming languages including, but not limited to, ObjectiveC, Java, and HTML5 as the functionality is not depending on any particular platform.

The display channel 574 is communicatively coupled the screen information component 504. The display channel 574 may send graphics data, e.g., screen frames, bit block transfers (BLITs) or a portion of the screen to be updated/changed, or other updates, to the screen information component 504. The screen information component 504 sends the graphics data information to the GPU 532 for processing. The GPU 532 then renders the graphics data and sends it to the display 534.

The video channel 576 is communicatively coupled to the video component 506. The video channel 576 transfers video data, e.g., video frames, from a server executing a mobile operating system (e.g., the operating system 326) to the VMI client 502. The video component 504 sends the video data information to the CODEC 536 for processing. The CODEC 536 decodes the video data and sends it to the GPU 532 which then renders the video data and sends it to the display 534.

The audio channel 580 is communicatively coupled to the audio record queue 508 and the audio queue 510. For recording, the audio CODEC 538 can receives audio input (e.g., from a line in) and sends the audio input to the audio record queue 508. The audio input received by the record queue 508 is then sent to the VMI server via the audio channel 580. For playback, the audio channel 580 can send audio data from virtual audio device (e.g., virtual speaker) of a mobile operating system executing on a server to the audio queue 510. The audio record queue 508 and audio queue 510 can then send the audio data to the audio CODEC 538 which can decode the audio data. The audio codec 538 can then send the audio data which may be decoded to the speaker 540 for audible output from the device hardware 530.

The input devices of the device hardware 530 can include a touch sensor 542, a keyboard 544, and/or a mouse 546. One or more of the input devices can send input data to the input queue 512 of the VMI client 502. The VMI client 502 can encode or process the input data and send it to the input channel 582. The input channel 582 can communicate the data to a server running a multi-user mobile operating system, as described herein.

The printer 548 of the device hardware 530 can be a physical printer. The printer 548 can send configuration information to the printer queue 514 of the VMI client 502. The configuration information can include parameters and properties associated with the printer 548 including, but not limited to, printer tray and paper sizes, duplex capabilities, connections, speed, and device status information. The VMI client 502 can encode or process the printer information and send it to the printer configuration and data channel 584. The printer configuration and data channel 584 then communicates the configuration information to a server executing a multi-user mobile operating system, as described herein.

The printer configuration and data channel 584 further communicates print data from an application executing on a server executing a mobile operating system, as described herein, to the printer queue 514. The printer queue 514 sends the data to the printer 548 for printing. In some embodiments, the printer queue 514 sends the data to a printer device driver for sending to the printer 548.

The global positioning system (GPS) component 550 is configured to determine a location of the device hardware 530 and send the location data to the location queue 516 of the VMI client 502. The GPS location data can thus be sent from the GPS component 550 of the client device to the server. In some embodiments, the VMI client 502 queries, e.g., periodic, the GPS component 550. The VMI client 502 sends location data from the location queue 516 to the location event channel 586 for communication to a server executing an application, e.g., a maps or navigation application, executing on a mobile operating system. In some embodiments, the server injects the GPS location data into a location queue on the server from which the applications executing on the server can be notified.

The microphone 552 captures audio data (e.g., via a transducer) and sends the audio data to the microphone component 518 of the VMI client 502. The VMI client 502 sends the audio data from the microphone component 518 to the microphone queue channel 588 for communication to a server executing an application, e.g., audio recording application, executing on a mobile operating system. In some embodiments, the microphone component 518 encodes, compresses, or processes the data prior to sending the data to the microphone queue channel 588. The microphone queue channel 588 can also send microphone control data, e.g., from the application executing on the server, to the microphone component 518 of the VMI client 502. The microphone component 518 then sends the control information to the microphone control 554.

The camera 556 captures image data (e.g., via an optical sensor) and sends the image data to the camera component 520 of the VMI client 502. The camera component 520 can encode, compress, or process the image data for sending to the camera queue channel 590. The camera queue channel 590 is configured to send the image data to a server executing a camera application on a multi-user mobile operating system. The camera queue channel 590 is further configured for sending camera control information, e.g., zoom, filter, camera mode, to the camera component 520 of the VMI client 502. The camera component 520 can send the control information to the camera control 558.

The fingerprint scanner 560 is configured to receive fingerprint data from a user. The orientation sensor 562 is configured to determine an orientation of the device hardware 530 (e.g., portrait or landscape) and determine changes in orientation, e.g., after a user has rotated a device. The fingerprint scanner 560 sends fingerprint data to the miscellaneous I/O component 522. The orientation sensor sends orientation data to the miscellaneous I/O component 522. The miscellaneous I/O component 522 is configured to encode, compress, or process the fingerprint data and/or the orientation data for sending via the miscellaneous I/O channel 592. The miscellaneous I/O channel 592 is configured to send the fingerprint data and/or the orientation data to a server executing an application on a multi-user mobile operating system.

The storage channel 594 is configured to send data, e.g., of a write request, to the file system component 524 of the VMI client 502. The file system component 524 is configured to send the data to the storage 564 of the device hardware 530. The file system 524 is further configured to request access to data of the storage 564, e.g., in response to a read request received via the storage channel 594. The storage 564 responds to the request by sending the corresponding data to the file system component 524. The file system component 524 sends the data to the storage channel 594 for communication to a server executing an application on a multi-user mobile operating system.

Figure 6:
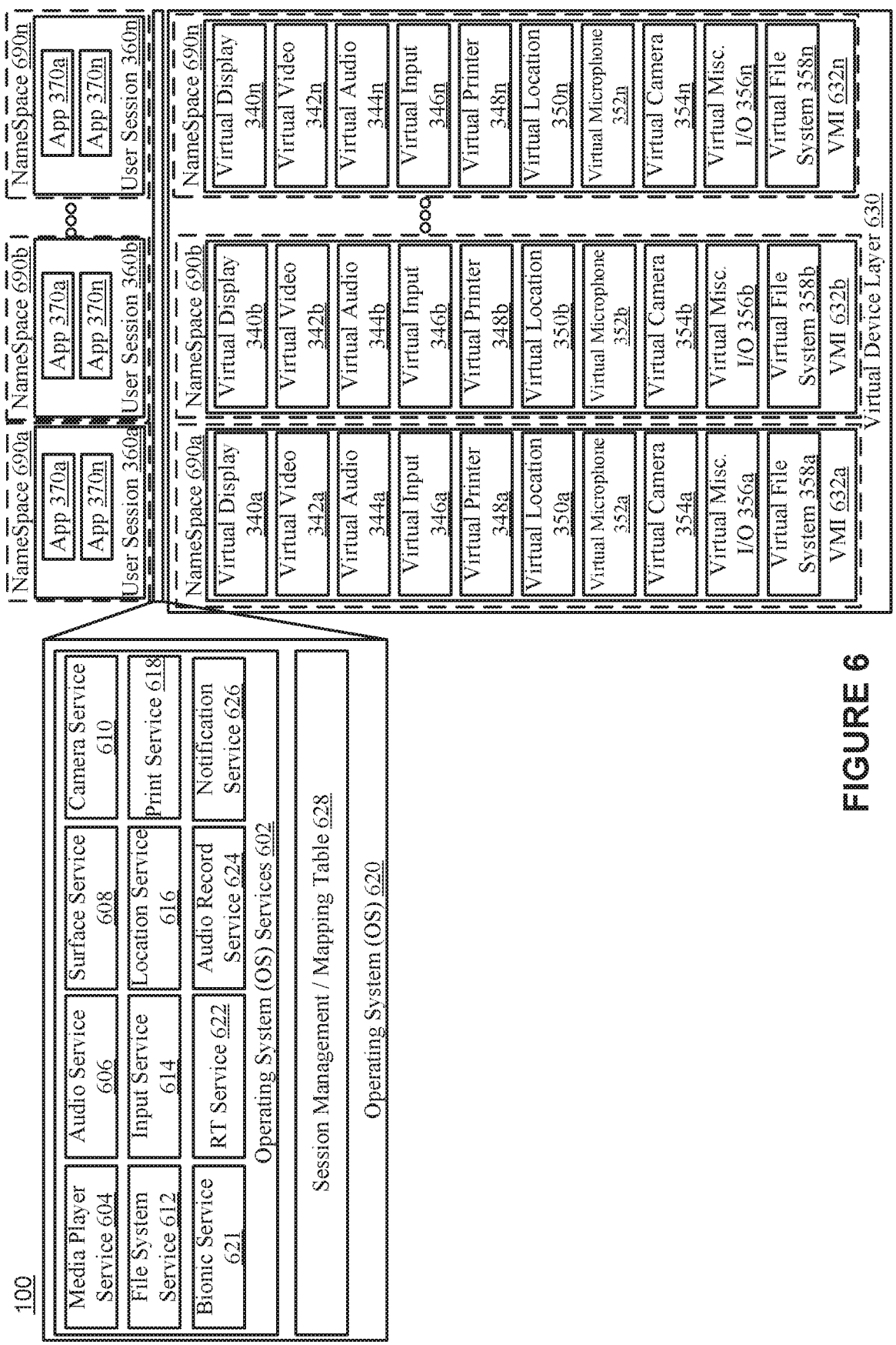
FIG. 6 shows example components of an operating system supporting application virtualization in accordance with various embodiments of the present invention.

FIG. 6 illustrates the server-side components of the mobile app virtualization components in accordance with embodiments of the present invention in further detail. In particular, FIG. 6 illustrates the operation of the mapping of a related user session and associated VMI via their common namespace. For instance, FIG. 6 shows example components of an operating system supporting application virtualization in accordance with various embodiments. FIG. 6 depicts how remotely hosted mobile apps and virtual devices associated with a user session are grouped under a unique Session ID or name space ID. The mobile applications 370a-n running on the remote server OS 620 are unmodified and can use existing APIs (e.g., Android APIs). The mobile applications can be any 3rd party applications including, but not limited to, email apps, browsers, text message app, Skype and Office available from Microsoft Inc., of Redmond, Wash., for instance. Any app can be considered. It is appreciated that only one instantiation of the server OS 620 is required.

The adding sessions and extending the core components within an operating system (e.g., Android) to render services to applications by associating them with unique sessions advantageously allows a single OS 620 to host multiple VMI users. There can be multiple user applications hosted within the same session for a user. The namespace 690a is associated with a user session 360a and a VMI 632a. The namespace 690b is associated with a user session 360b and a VMI 632b. The namespace 690n is associated with a user session 360n and a VMI 632n. Each namespace is a unique name.

The instances of applications 370a-n can be unmodified mobile applications executing on top of the operating system 620. APIs calls are sent to and from the instances of applications 370a-n and the operating system 620. The operating system 620 is configured to receive or capture API calls (e.g., via an API sandbox) from the instances of the applications 370a-n.

In some embodiments, the OS 620 is further configured to provide information on the application that originated an API call. The OS 620 can insert the session ID or namespace (e.g., namespace indicator) into an API call based on a mapping of the process of an instance of an application and a session ID or namespace. The modified API call can then be sent to the appropriate virtual device associated with the same session ID or namespace.

For example, an API call from an instance of the application 370 of namespace 690a can be modified to include an indicator associated with the namespace 690a. The modified API call can then be sent to the VMI 632a. The VMI 632a can then route the modified API call to the appropriate virtual device of the namespace 690a based on the indicator associated with the namespace 690a.

The single server operating system 620 includes OS services 602, and session management/mapping table 628. The OS services 602 include a media player server 604, an audio server 606, a surface service 608, a camera service 610, a file system service 612, an input service 614, a location service 616, a print service 618, a bionic service 621, a runtime (RT) service 622, an audio record service 624, and a notification service 626.

The media player server 604 is configured for receiving one or more requests (e.g., API calls) from applications for playing or outputting video. The audio server 606 is configured for receiving one or more requests (e.g., API calls) from applications for playing or outputting audio. The surface service 608 (e.g., SurfaceFlinger of the Android operating system) is configured for receiving one or more requests (e.g., API calls) from applications for outputting display data.

The camera service 610 is configured for receiving one or more requests (e.g., API calls) from applications for camera capture and/or camera control. The file system service 612 is configured for receiving one or more requests (e.g., API calls) from applications for reading and/or writing data. The input service 614 (e.g., InputService of the Android operating system) is configured for receiving one or more requests (e.g., API calls) from applications for input data, e.g., touch event, key input, and/or mouse input. For example, an application can request, e.g., via an API, that the input service 614 notify the application when a touch event has occurred. The input manager 614 can monitor the virtual input device 346a and when a touch event is received, the input manager 614 notifies the application and sends the touch event.

The location service 616 (e.g., LocationService of the Android operating system) is configured for receiving one or more requests (e.g., API calls) from applications for location events and/or location data. The print service 618 (e.g., the PrintService of the Android operating system) is configured for receiving one or more requests (e.g., API calls) from applications for printer configuration data and/or print requests. The bionic service 621 is configured for receiving one or more requests (e.g., API calls) from applications for performing various C library functions. The runtime (RT) service 622 is configured for receiving one or more requests (e.g., API calls) from applications for functions that support the execution of an application. The audio record service 624 (e.g., AudioRecord service of the Android operating system) is configured for receiving one or more requests (e.g., API calls) from applications for audio recording functions. The notification service 626 is configured to receive notifications from applications 370a-n and further configured to send the notifications to a client application (e.g., VMI client 502).

The various services of the OS services 602 are configured to query or access the session management/mapping table 628 to determine a session or namespace associated with an instance of an application. The various services of the OS services 602 may associate a service request from an application with the Session ID or namespace, which in turn enables the services to complete the request using the appropriate virtual device associated with the session, e.g., the virtual device sharing the same namespace. The Android 602 internal components, e.g., Media Player Service 604, File System 612, or Audio Flinger 606 now associate all the service requests from the app with its session ID, and in turn this enables them to complete the request using the virtual device associated with that session ID.

The virtual devices 340a-358n need not mimic the physical devices they are replacing in a 1:1 fashion. For example, the virtual display 340a can be simply a mapped memory that is not backed by any frame buffer device. The virtual display 340a can efficiently get updated regions (e.g., BLITs) before the final composition and rendering is done via a hardware composer or hwcomposer and transmit the updated Block Image regions to the client device (e.g., the device 302) for final composition and rendering. In some embodiments, several components that are part of a Hardware Abstraction Layer (HAL) like hwcomposer can just be NULL operations, just to satisfy the architectural requirements of an operating system (e.g., Android). Without the ability to have multiple sessions, the user applications and services would just use the devices associated with HAL irrespective of the session.

It is appreciated that the session management/mapping table 628 includes information about what session an application is running within and therefore performs an important function to route application requests to the proper VMI (and eventually to the proper virtual device within the VMI). That is, the session management/mapping table 628 includes a pairing of virtual devices and applications. For example, the input service 614 may receive a request from an instance of the application 370a executing in user session 360a and the input service 614 queries the session management/mapping table 628 to determine that the application 370a is executing in user session 360a. Based on receiving data that the application 370a is executing in user session 360a, the input service 614 requests the virtual input device 346a for input events. The session management/mapping table 628 can further include data for mapping a user with a session or namespace.

As another example, an instance of the application 370a of namespace 690a can be a word processing application and sends a print request to the print service 618. The print service 618 accesses or request data from the session management/mapping table 628 as to which session or namespace the application is running within. Based on the instance of the application 370a being associated with namespace 690a, the print service 618 sends the print request to the associated virtual printer 348a.

Figure 7:
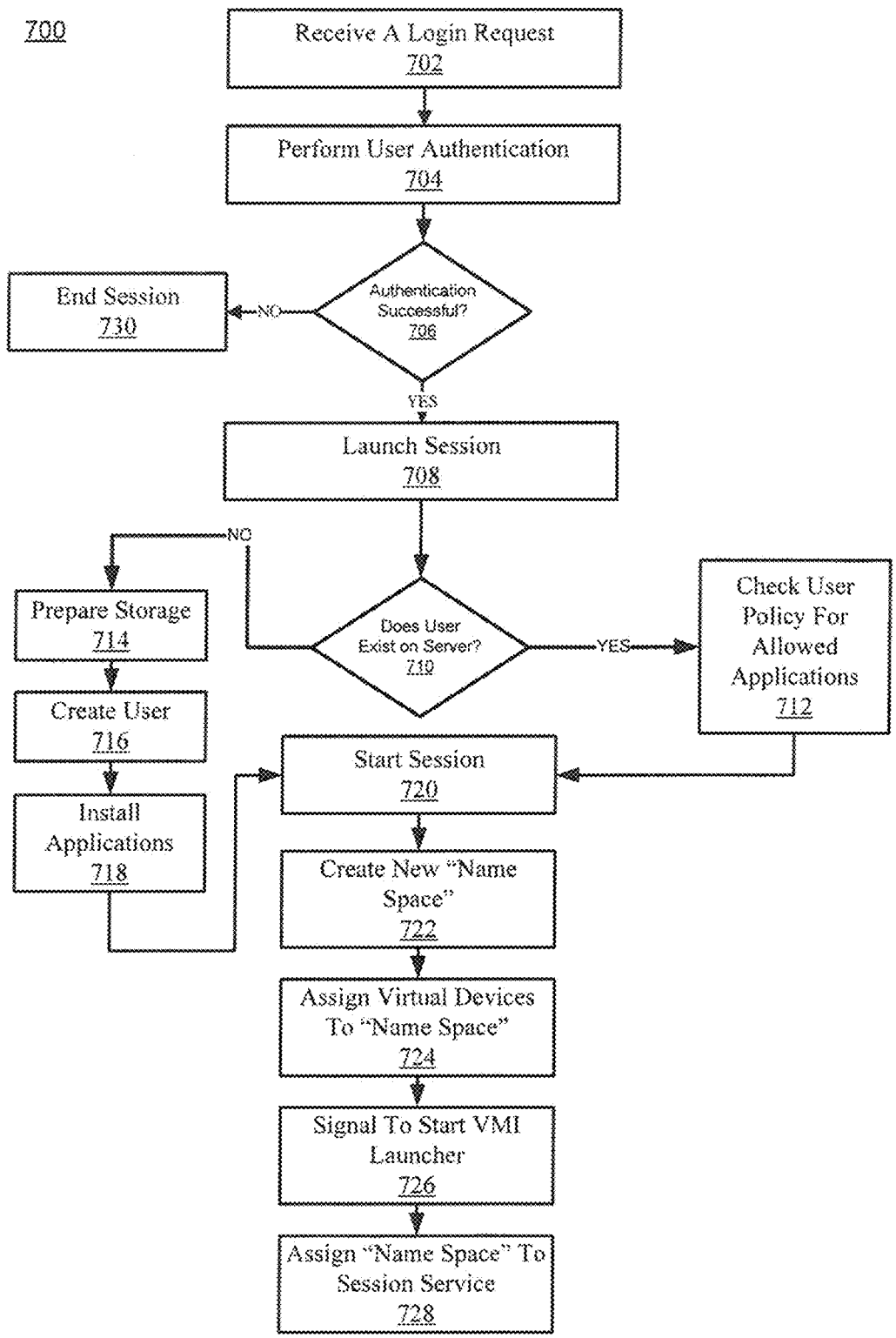
FIG. 7 shows a flowchart of an example computer controlled process for authentication, creation of a user session, and configuration of the user session in accordance with various embodiments of the present invention.

FIG. 7 shows a flowchart of an example computer controlled process for authentication, creation of a user session, and configuration of the user session within the mobile app virtualization architecture in accordance with various embodiments. In particular, FIG. 7 depicts a process 700 of when a user session and associated namespace are created.

VMI can include two distinct components: a VMI launcher service and a VMI network service. The VMI launcher service is described with respect to FIG. 7. The VMI network service is described with respect to FIG. 8.

The process 700 of FIG. 7 can be performed by a launcher component a VMI. The VMI launcher service is configured to initialize virtual devices with appropriate parameters of a session, e.g., display resolution, printer formats (e.g., pdf, Dots Per Inch (DPI)), input type (e.g., keyboard/mouse, touch, multi-touch), or camera (e.g., resolution, HDR, frame rates). The VMI launcher service is further configured to authenticate users, creating a Name Space/Session context within an operating system (e.g., Android) and to associate the virtual devices and necessary services with the session context. The VMI launcher service is further configured to establish and enforce application policies. The VMI launcher service is further configured to launch mobile application and associating them with the session context.

In some embodiments, the VMI launcher service can create a new session, a new mapping table, update the session table and provide input data into the network service. The launcher can provide the device information to a VMI component to configure virtual devices based on the device information received with the login request. The launcher is further configured to create and delete sessions.

At block 702, a login request is received. The login request can include user information, e.g., a login and password. The login request can further include device information that can be used to configure one or more virtual devices.

At block 704, user authentication is performed. The authentication can be done locally within the operating system itself or using an external authentication service e.g., Lightweight Directory Access Protocol (LDAP) or Active Directory, to complete the authentication.

At block 706, whether the authentication is successful is determined. If the authentication is successful, block 708 is performed. If the authentication is not successful, block 730 is performed.

At block 708, the session is launched in order to provide mobile app virtualization for a mobile device user. In some embodiments, the launching of a session can include provisioning resources, e.g., storage space.

At block 710, it is determined whether the user already exists on the server. The server can be the server executing the multi-user mobile operating system. If the user already exists on the server, block 712 is performed. If the user does not exist on the server, block 714 is performed.

At block 712, the user policy is checked for allowed applications. This can include checking application policies for applications that a user is able to execute. For example, execution of game applications that have been purchased could be enabled by an application policy. Access to certain applications may be granted based on a user's credentials. For example, a user in the accounting department of a hospital may not be able to access a medical records application, etc.

At block 714, the user is determined to not already exist on the server so storage is prepared. The storage preparation can include allocation of storage for saving a user profile and other user information including, but not limited to, a user's files, photos, videos, documents, etc.

At block 716, the user is created on the server. The creation of the user can include transferring user data to the server executing the VMI launcher service.

At block 718, one or more applications are installed for the user into a session that is unique for the user. For example, the server may install copies of the applications into the user's session for later execution.

At block 720, the session is started.

At block 722, a new "name space" is created for the session. The name space or session ID is created for applications and virtual devices to be associated therewith.

At block 724, virtual devices are assigned to the newly created "name space." The virtual devices may be configured based on the device information received with the login request and the created virtual devices are assigned to the "name space" and thereby associated with the applications of the "name space." For example, a virtual display device, a virtual touch input device, a virtual GPS device, a virtual printer, a virtual camera, a virtual microphone, a virtual file system, a virtual speaker, and a virtual miscellaneous I/O device can be associated with the "name space."

At block 726, the VMI launcher is started. The VMI launcher can present a graphical user interface (GUI) allowing a user to select applications for execution (e.g., remote execution).

At block 728, the "name space" is assigned to the session service. This can include creating and updating entries in the session management/mapping table to reflect the new session and "name space." This entries in the session management/mapping table (628 FIG. 6) can be updated so that each time a new process is created it can be associated with the session table and each of the virtual devices are associated with the session.

Figure 8:
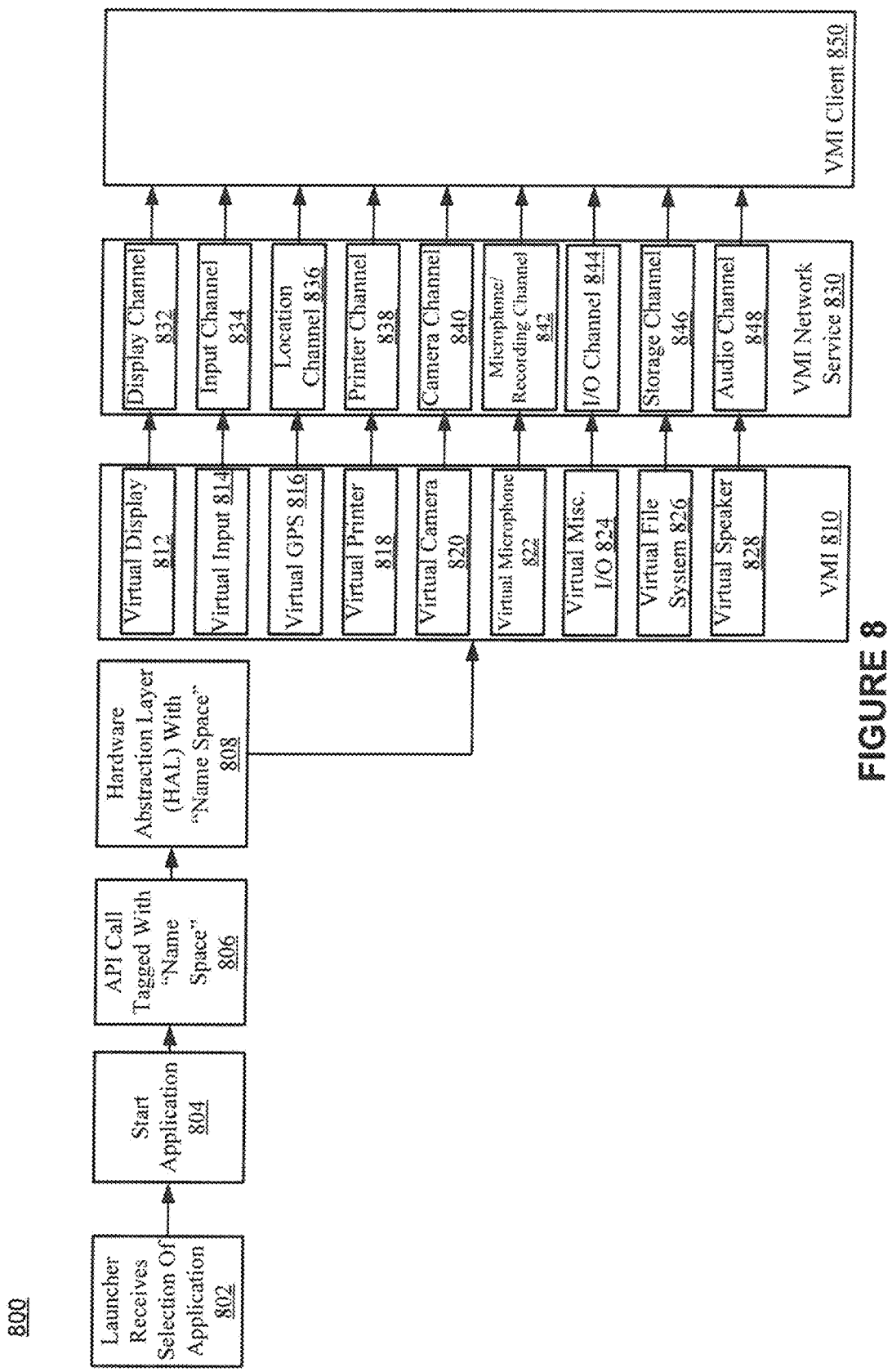
FIG. 8 shows an example dataflow of an application launch in accordance with various embodiments of the present invention.

FIG. 8 shows an example dataflow diagram of an application launch in accordance with various embodiments of the mobile app virtualization architecture. FIG. 8 depicts the launching of a new application on a server and communications of VMI protocol application streaming. VMI Network service 830 acts a protocol service between the virtual devices 812-828 and VMI client application 850. In some embodiments, it carries the data between virtual devices 812-828 and VMI client application 850 in a compressed and optimally encoded byte stream. Each channel can have its own format as the data sent through each channel is dependent on the type of virtual device and service. Each application can depend on various APIs and services within the operating system. For example, an application like YouTube player will depend on the Media Player Service for decoding audio and video, Surface Flinger for rendering the output as well as overlay information like Play, Pause, Forward, Audio Flinger for playing back audio, Input Service for handling touch input allows the user to select and play videos, GPS for enabling location service, and more. Each of the necessary APIs and services the application utilizes will understand that the user application is part of the session and they will in turn complete the necessary service requested by the YouTube application utilizing the virtual devices 812-828 associated with the session. The events and data necessary for the virtual devices 812-828 to complete the operations are handled by the VMI Network service 830.

The VMI 810 executes on a server. The VMI client 850 operates to communicate with the VMI 810 and the application through the VMI network service 830. The VMI network service 830 includes the various channels to enable communication to and from the virtual devices of the VMI 810 to and from the VMI client 850. The VMI network service 830 can operate a runtime data path.

Various channels described with respect to FIG. 8 may operate and function in a substantially similar manner as to the communications channels 570 of FIG. 5. The display channel 832 is configured to carry display updates with time stamps from Virtual Display device 812 to client device (not shown) executing the VMI client 850. For example, display data from an application graphical user interface is sent to the virtual display device 812 of the VMI 810 which then sends the data via the display channel 832 to the VMI client 850 for display to a user.

The input channel 834 is configured to carry input, keyboard, mouse, and touch events from the VMI client application 850 and inject them to the user application via the virtual input device 814. The printer channel 838 is configured to carry the print stream from the operating system to the VMI client application 850 and allow the VMI client application 850 to print the data of the print stream using a local printer coupled to the device (e.g., phone) executing the VMI client application 850.

At block 802, the launcher is executed. The launcher allows a user to select an application for execution.

At block 804, an application is launched on the server side. The application is launched within a session or name space which is associated with a user and one or more virtual device (and is launched within framework 600 of FIG. 6).

At block 806, an API call is received from the application and the API call is tagged with the "name space." The tagging with the "name space" can be performed by accessing a session management/mapping table 628 (FIG. 6) to determine the "name space" associated with the application.

At block 808, the API call is sent to the hardware abstraction layer (HAL) with the "name space" which routes the API call to an appropriate virtual device of the VMI 810, device 812 for instance.

Figure 9:
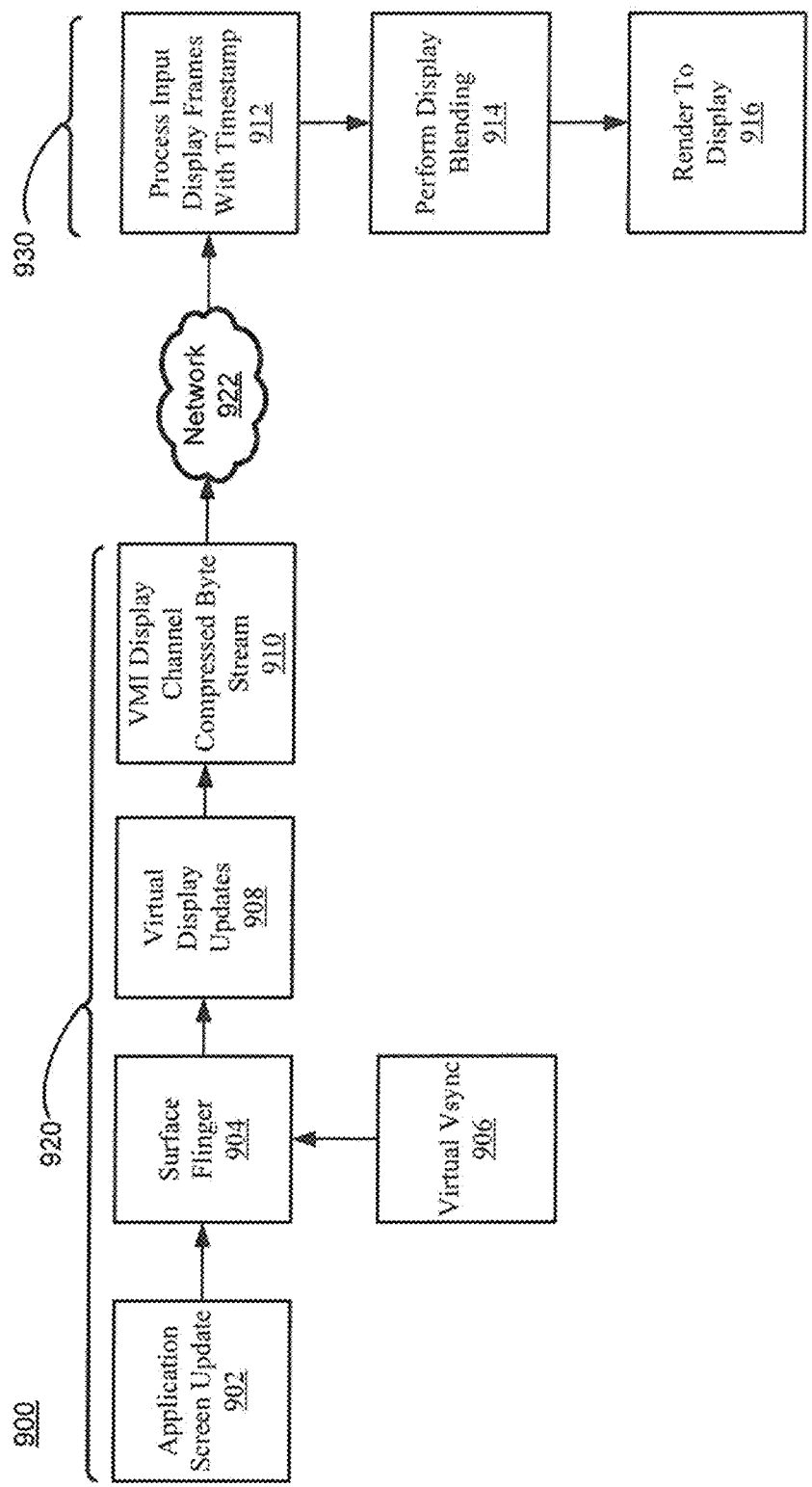
FIG. 9 shows an example dataflow of a display channel in accordance with various embodiments of the present invention.

FIG. 9 shows an example dataflow of a display channel in accordance with various embodiments for a mobile virtualized app to display information on an associated client mobile device screen. FIG. 9 depicts a dataflow diagram 900 of a display channel.

An application screen update 902 is sent from a virtualized app on the server to the surface flinger 904 of the OS. The surface flinger 904 outputs the virtual display updates 908. In some embodiments, a virtual display device (e.g., virtual display device 812) is a consumer of display updates from Surface Flinger. The virtual display device carries the BLIT updates between each frame and efficiently compresses and encodes the image region and sends them over the network.

The virtual display updates 908 can be processed by the virtual display device (of the VMI session associated with the virtualized app) to generate a VMI display channel compressed byte stream 910. In some embodiments, before the final BLIT composition is done by Surface Flinger, the updated regions are encoded and transmitted. Each frame could be of varying size depending on the geometry of the update. For example, if only one character is updated, then the actual geometry of update could be just a 10×10 pixel BLIT with an offset marking the exact location where the character is located on the screen. The data can also carry time stamps ensuring that updates or animation is played back smoothly.

In some embodiments, for each vsync, the surface flinger will analyze the application display buffer for screen updates and when there is a change in a display surface, the updated data will be transmitted over the display channel. When the client receives the display channel output, it will compose the updates with the previous screens and display it back using the HW capability available on the device. Sometimes, it may also compose or overlay the Display channel data with Video Channel Data if Video Channel data is present.

Some applications may require the final display surface to be rendered and in such a case, the Surface Flinger can compose the final display surface using OpenGL for Embedded Systems (GLES) APIs. The virtual display updates 908 can be determined based on calculating the difference between frames of each vsync, encoding the updated regions, and transmitting them to the clients.

In some embodiments, the virtual display device is configured to efficiently handle applications that directly render display data using GLES APIs to the display surface. Embodiments can include GLES APIs that are extended to handle sessions IDs or namespaces. APIs, e.g., eglGetDisplay, eglSwapBuffers, eglInitlize, as well as APIs that handle GPU shaders are extended to handle Session IDs as well as handle a virtual display device as a location where the display data is rendered. Within the display architecture of Android, both GLES APIs and SurfaceFlinger are configured to handle virtual displays to enabling user to run un-modified mobile apps.

In some embodiments, by extending hwcomposer and gralloc modules in Android, a remote Android Server can utilize physical GPUs, e.g., desktop GPUs or Mobile GPUs, for the actual GLES and Shader compute, while rendering them to a pBuffer Surface mapped to a virtual display device of the session.

A virtual vertical synchronization (vsync) 906 is sent to the surface flinger 904, in place of a physical vsync, to cause a periodic refresh of the screen to be sent to the client device.

In some embodiments, vsync 906 is not generated by any physical hardware, the vsync timer is set based on application needs. A software timer as part of a virtual display device can wake up surface flinger and act like a virtual vsync interrupt. Vsync can be disabled or slowed down when there is no application activity in the session (e.g., to conserve power). Other parameters like type of application, inputs from the input channel or the location channel can be used to effectively set the best vsync to optimize between CPU utilization, network traffic, and user experience.

In some embodiments, the virtual display device for the session is created when the display channel is established. The client application (e.g., VMI client 850) provides information like DPI, resolution, and screen size during the initial establishment of the display channel. Each of the applications executed within the session context will share the same virtual display device and its parameters. Each user session has its own virtual display device and can be initialized with a completely different set of parameters unique to their own session.

The VMI display channel compressed byte stream 910 is sent over the network 922 though a display channel, e.g., the display channel 832, to a VMI client 930 (e.g., VMI client 850). The VMI display channel compressed byte stream 910 can include display frames with timestamps.

The blocks 912-916 may be performed by a client 930, e.g., a mobile device. At block 912, the client 930 accesses the received VMI display channel compressed byte stream 910. The client 930 further processes and determines display frames with timestamps 912. In some embodiments, the processing of the VMI display channel compressed byte stream 910 includes composition of one or more BLITs with one or more frames based on timestamps.

At block 914, blending of the display frames with timestamps 912 is performed. The display blending can include blending data, e.g., of BLITs, with the current display output.

At block 916, the results of the display blending are output for rendering to a display 916. The result of the display blending can be output to a GPU for rendering and display by a display device (e.g., of device hardware 530, FIG. 5). In some embodiments, the results of the display blending are output to the display device using a protected hardware path. The results of the display blending can be output to a frame buffer for display.

FIGS. 10A-B show example input event processing in accordance with various embodiments with respect to the mobile app virtualization architecture. FIG. 10A depicts a process performed by a client (e.g., VMI client 850) in monitoring for an input event.

At block 1002, the client application (VMI client 502, FIG. 5) is started. At block 1004, whether an input event has happened on the client device is detected. The input event may be a motion event, e.g., a touch event or a mouse input, a key event, or an orientation event (e.g., a change in device orientation). A key event can be a key press on a virtual (e.g., on screen) or physical keyboard of the client device. A motion event can be an input event captured from a touch pad or mouse coupled to a client device. A touch event can be a swipe, a scroll, or a multi-touch zoom captured from a touch panel or sensor on the client device. An orientation event can be an event captured from device, e.g., a gyroscope, that detect tilt, rotation, and other orientation event from a device. If an input event is detected, block 1008 is performed. If an input event has not been detected, block 1004 is performed.

At block 1008, protocol encoding is performed on the data of the input event. The data of the input event may be compressed and encoded, e.g., along with a timestamp, for transmission to a mobile operating system executing on the server. At block 1010, the encoded input event data is sent to a mobile operating system executing on the server via a communication network (e.g., via an input channel 834).

FIG. 10B depicts a process 1040 for processing an input event received from a client device, the process 1040 is performed by a server executing a multi-user mobile operating system.

At block 1050, the client communication of an input event is received. The input event data may be received at a VMI network service (e.g., VMI network service 830).

At block 1052, the input event is mapped to the appropriate session ID or namespace associated with the client device. In some embodiments, the VMI network service accesses the input event data and determines which name space is associated with the input event. The input event data is then sent to the virtual input device of the appropriate name space associated with the input event.

At block 1054, whether the input event is a key event (e.g., KEY PRESS EVENT) is determined. In some embodiments, the blocks 1054, 1070, and 1080 are performed by a virtual input device (e.g., virtual input device 814). If the input event is a key event, block 1056 is performed. If the input event is not a key event, block 1070 is performed.

At block 1056, a virtual input event manager is determined. In some embodiments, an API is determined (e.g., a call back API) to send the input event to an associated application of the identified namespace. Keyboard events can be delivered to the application via the InputEvent API.

At block 1058, a window handle identifier (ID) for a session is determined. In some embodiments, the window handle identifier ID for a session is determined by accessing the session management/mapping table.

At block 1060, the input event is injected in to the virtual display. In some embodiments, the displays of multiple applications in a session are in a group or display group. The top display in the display group is associated with the active or in focus application. The window handle ID for a session may be associated with a display group. The input event can then be injected into the display of the top application of the display group.

At block 1070, whether the input event is a motion event is determined. If the input event is determined to be a motion event, block 1072 is performed. If the input event is determined to not be a motion event, block 1080 is performed. Motion events can be delivered to the appropriate application in the identified namespace via the Motion Event APIs.

At block 1072, a motion event is created based on the input event. In some embodiments, a motion event is created based on the properties of the virtual input device.

At block 1074, the motion event is injected into the activity view. In some embodiments, the motion event is injected into the input service (e.g., input service 614) of the operating system.

At block 1076, the input event is dispatched to the virtual display based on a display ID. In some embodiments, a display identifier associated with a virtual display device associated with a session is determined based on the session management/mapping table. The motion event is then injected into the virtual display device associated with the session.

At block 1080, whether the event is an orientation event is determined. If the input event is an orientation event, block 1082 is performed. If the input event is not an orientation event, block 1050 is performed. Orientation events can be delivered to the application via the Sensor-Manager APIs.

At block 1082, the orientation event is processed. In some embodiments, the orientation event is processed and sent to the input service of the operating system which adjust display and video and/or audio processing based on the orientation event.

Figure 11A:
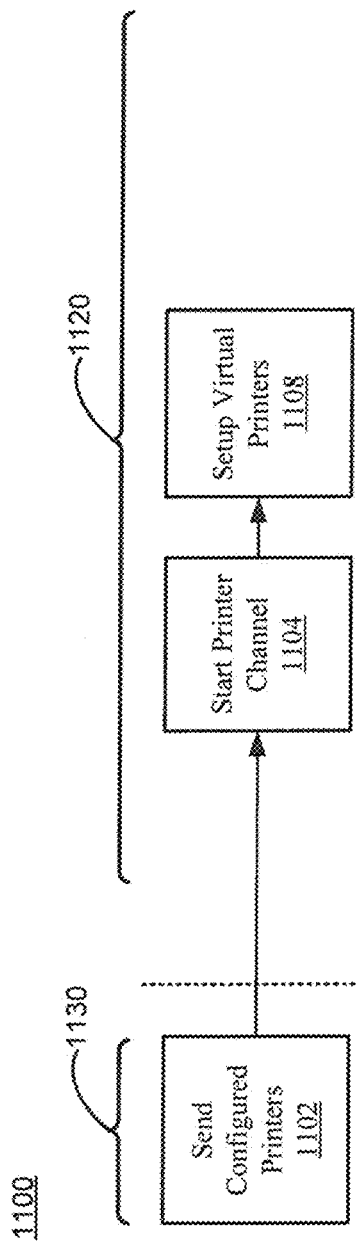
FIGS. 11A-B show example printer functionality in accordance with various embodiments of the present invention.
Figure 11B:
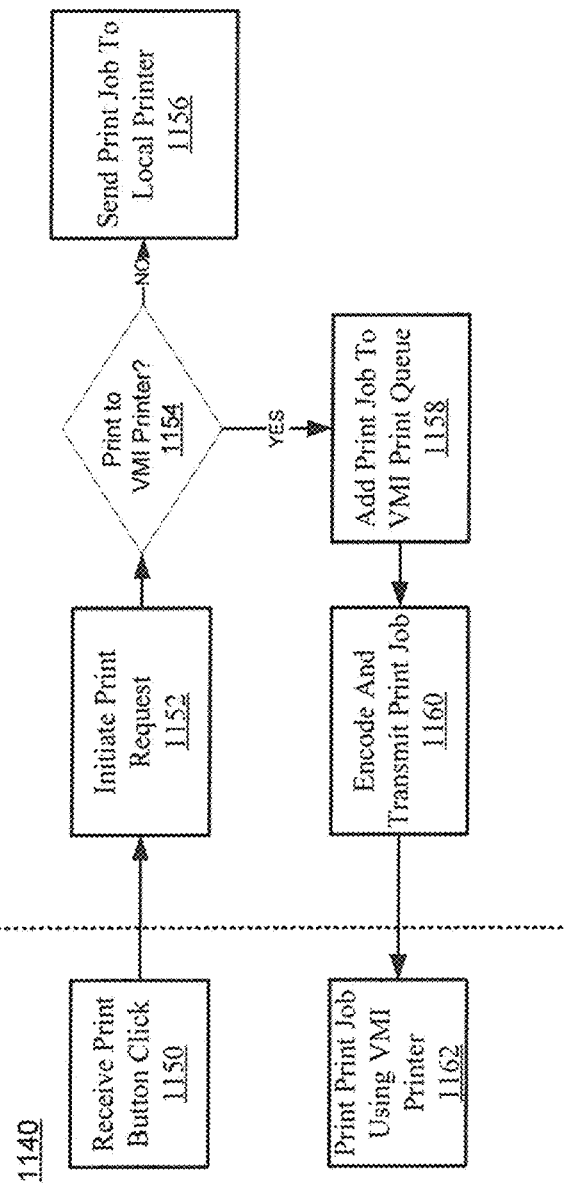

FIGS. 11A-B show example printer functionality in accordance with various embodiments. FIG. 11A depicts an example process 1100 performed for configuring a virtual printer. The blocks 1102, 1150, and 1162 can be performed by a client application (e.g., VMI client 850) executing on a client device (e.g., the device 302). The blocks 1104, 1108, and 1152-1160 can be performed by a server executing a multi-user mobile operating system.

At block 1102, the client sends configured printer information. The information can comprise printer configuration information of printers that are coupled to a client device (e.g., the device 302). The configured printer information is sent to a server executing a mobile operating system. The configured printers can be sent to the server during login, e.g., as part of a login request.

At block 1104, the printer channel is started. In some embodiments, the printer channel is started as part of an initialization process by a launcher (e.g., the launcher portion of a VMI network service).

At block 1106, one or more virtual printers are setup. In some embodiments, a virtual printer is setup for each print of the configured printer information. One or more virtual printers are configured with the properties of a configured printer associated with a respective virtual printer. Embodiments may further support adding of printers after a VMI client has initialized the printer channel via add/delete messages for an existing user session.

FIG. 11B depicts an example process 1140 performed for handling a print request. At block 1150, a print button is clicked on the client device. The print button may be clicked or selected from a graphical user interface display on a client device of an application that is executing on a server. The print button click can be an input event sent to the application via an input channel (e.g., input channel 834) and a virtual input device (e.g., virtual input device 814). The print button click is sent to the appropriate application of the session.

At block 1152, a printer request is initiated. The print request is initiated by the application executing on the server. The print request can be sent to the print service (e.g., the print server 618) of the multi-user mobile operating system executing on the server.

At block 1154, whether the print request is for a VMI printer is determined. The print request may be analyzed to determine whether the print request should be sent to a local printer coupled to the server or a virtual printer associated with a printer coupled to the client device. Whether the print request is for a VMI printer can be based on a user configuration policy that indicates whether a particular user can print to a VMI printer. If the print request is for a VMI printer, block 1158 is performed. If the print request is not for a VMI printer, block 1156 is performed.

At block 1156, the print job is sent to the local printer. The local printer can be a printer locally coupled to the server remotely executing applications for the client. The local printer could also be a print server or other printing device coupled to the server.

At block 1158, the print job is added to the VMI print queue. In some embodiments, the print job may be added to the VMI print queue by sending the print request to the virtual printer of a mobile operating system (e.g., the VMI 632*a*).

At block 1160, the print job is encoded and transmitted. The print job may be encoded and transmitted by a VMI network service (e.g., VMI network service 830). The encoding may include compression of the print job. The print job can be transmitted through a print channel (e.g., print channel 838).

At block 1162, the print job is printed using a VMI printer coupled (e.g., directly to) the client device. The print job can be sent to a VMI printer coupled to the client device (e.g., the device 302) by a client application (e.g., VMI client 850). In some embodiments, the client application coverts the encoded print job to printable data and sends the data to a physical printer coupled to the client.

Figure 12:
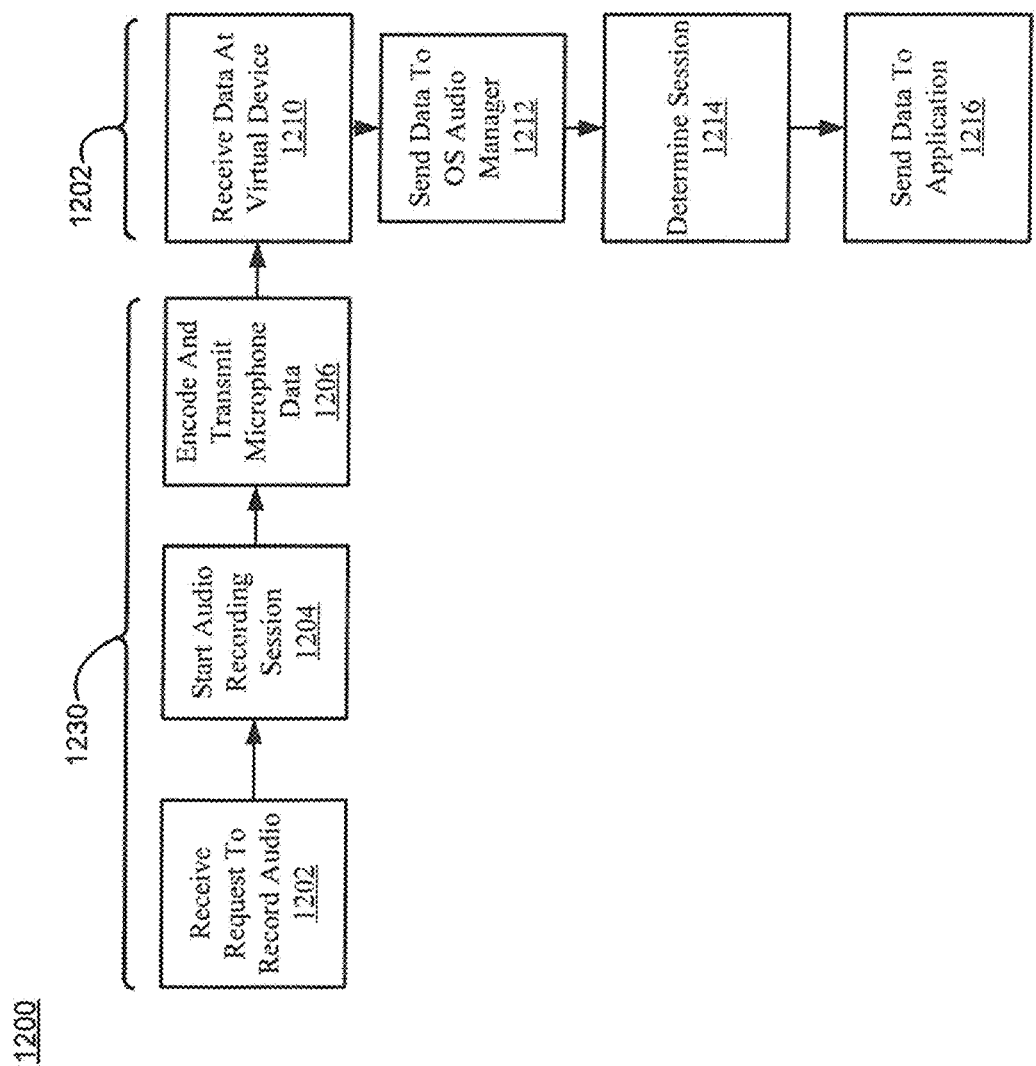
FIG. 12 shows example microphone channel processing in accordance with various embodiments of the present invention.

FIG. 12 shows example microphone channel processing in accordance with various embodiments. FIG. 12 depicts a process of capturing microphone data and sending it to a remotely executing application. The blocks 1202-1206 may be performed by a client application. The blocks 1210-1216 can be performed by a server.

In some embodiments, prior to login, the VMI client application collects microphone information, e.g., supported encoding formats, number of channels and other properties of the microphone available in the client device. The microphone information is sent during the login process (e.g., FIG. 7). The microphone channel is created, using the microphone information provided by the client app, the VMI Session manager (e.g., the session management/mapping table 628) creates one or more virtual microphones for the associated session.

At block 1202, a request to record audio is received. The request can be received at the client from the remotely executed application. For example, when a user launches an application, e.g., Skype or other application that uses a microphone, the record request is sent to the associated client device to start the recording from a physical microphone coupled to the user device.

At block 1204, an audio recording session is started. The client application can request recording by a microphone device (e.g., the microphone 552) of the device hardware of the client.

At block 1206, the microphone data is encoded and transmitted. The microphone data can be compressed and sent via a microphone channel (e.g., the microphone queue channel 588).

At block 1210, the data is received at a virtual device (e.g., virtual microphone device 352*a*). The data may be received at a particular virtual device based on the sending of the data via a microphone channel. In some embodiments, the client app sends the microphone data in appropriately encoded format to an Android Server, then the data is routed to the remote mobile application via the virtual microphone device.

At block 1212, the data is sent to the OS audio manager (e.g., audio record service 624). The data can be sent to an audio recording service of the operating system for sending to the appropriate application.

At block 1214, a session is determined. The session associated with the user and the application that requested recording of data by the microphone is determined. In some embodiments, the session is determined by the audio recording service of operating system based on querying a session manager/mapping table (e.g., the session management/mapping table 628).

At block 1216, the data is sent to the application that requested microphone recording data. The data may be sent to the application based on the determined sessions (e.g., block 1214).

Figure 13:
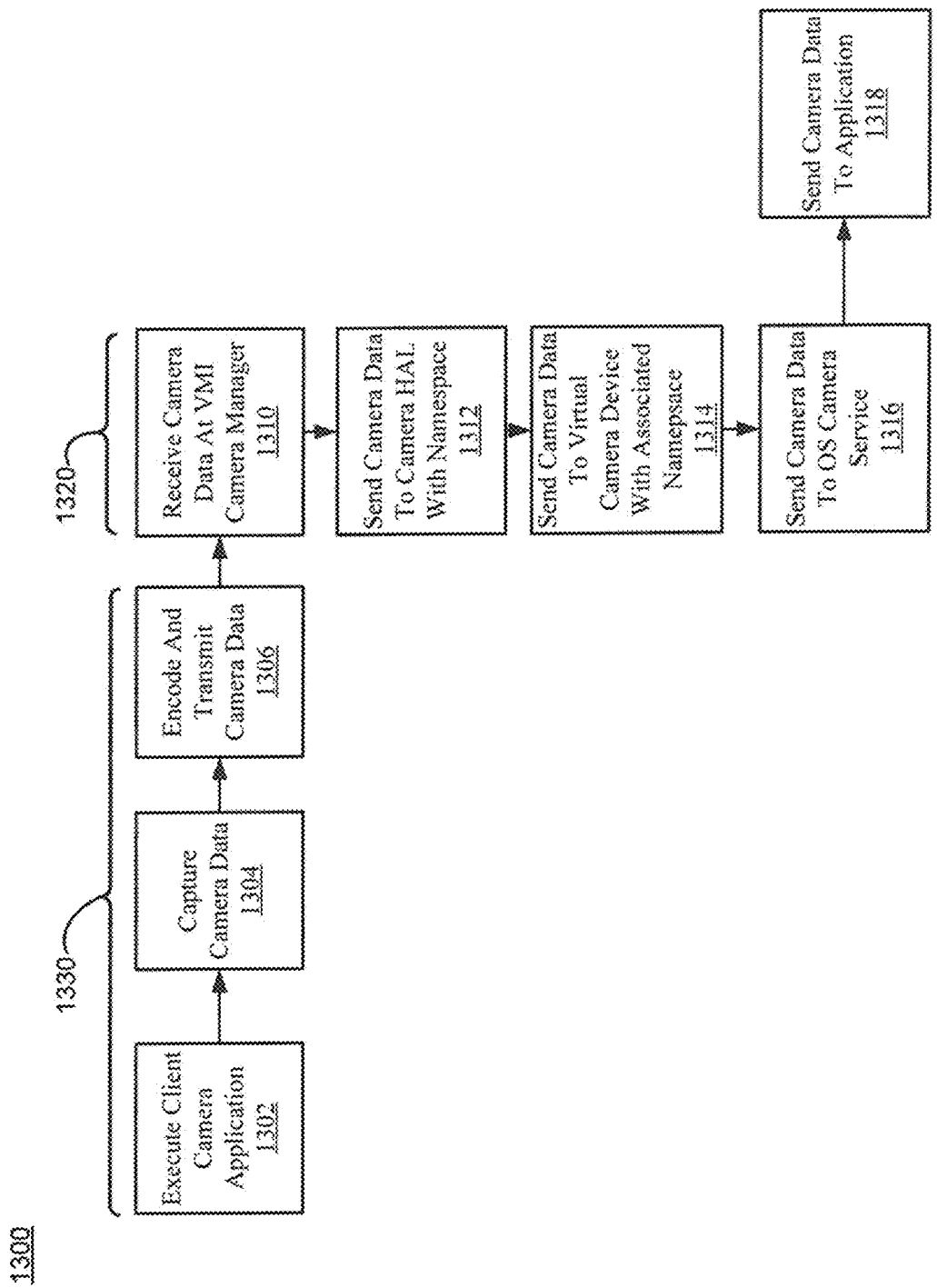
FIG. 13 shows example camera data processing in accordance with various embodiments of the present invention.

FIG. 13 shows example camera data processing in accordance with various embodiments. FIG. 13 depicts a computer-controlled process 1300 of capturing camera data for a remotely executing application.

In some embodiments, before creating the camera channel (e.g., camera queue channel 590), the client application collects camera device information from the local coupled camera (e.g., coupled to the device 302). Several parameters including, but not limited to, high speed capture, High Dynamic Range (HDR), Resolution, and number of cameras coupled like e.g., front and back, are passed to the VMI server as part of camera channel creation.

At block 1302, the client camera application is executed. The client camera application can be a camera application for capturing and sending camera data to a server executing a remote camera application. In some embodiments, the remote application starts the recording process using Camera API, the request is handled by the virtual camera device. The request for recording is sent to the VMI client application, which starts the recording from the physical camera connected to the end users device.

At block 1304, camera data is captured by the client device. The camera data can be captured from a physical camera of a device executing a VMI client (e.g., VMI client 850).

At block 1306, the camera data is encoded and transmitted. The camera data can be compressed and sent via a camera channel (e.g., the camera queue channel 590).

At block 1310, the camera data is received at a VMI camera manager of a VMI network service. The camera data may be received at a particular device based on the sending of the camera data via a camera channel. In some embodiments, the client app sends the camera data in appropriately encoded format to a VMI Server, then the data is routed to the remote mobile application via the virtual camera device.

At block 1312, the camera data is sent to a camera hardware abstraction layer (HAL) associated with a name space associated with the client device.

At block 1314, the camera data is sent to a virtual camera device associated with the name space. The camera data may be routed to the appropriate virtual device based on a camera channel associated with the name space that the camera data was received from.

At block 1316, the camera data is sent to the operating system camera service (e.g., camera service 610). The camera data can be sent via the virtual camera device to the operating system camera service.

At block 1318, the camera data is sent to an application associated with the session. The camera data can be sent to the application based on the operating system camera service querying the session management/mapping table (e.g., the session management/mapping table 628) to determine the proper session.

In some embodiments, camera data (e.g., frames) is encoded and sent back to an Android VMI Server and delivered to the application of the session via camera APIs. The Virtual Camera and the mobile application that initiated the camera capture are paired by the VMI session or namespace. The application running remotely executes on the server as if it is accessing a physical camera instead of accessing a virtual camera device.

Figure 14:
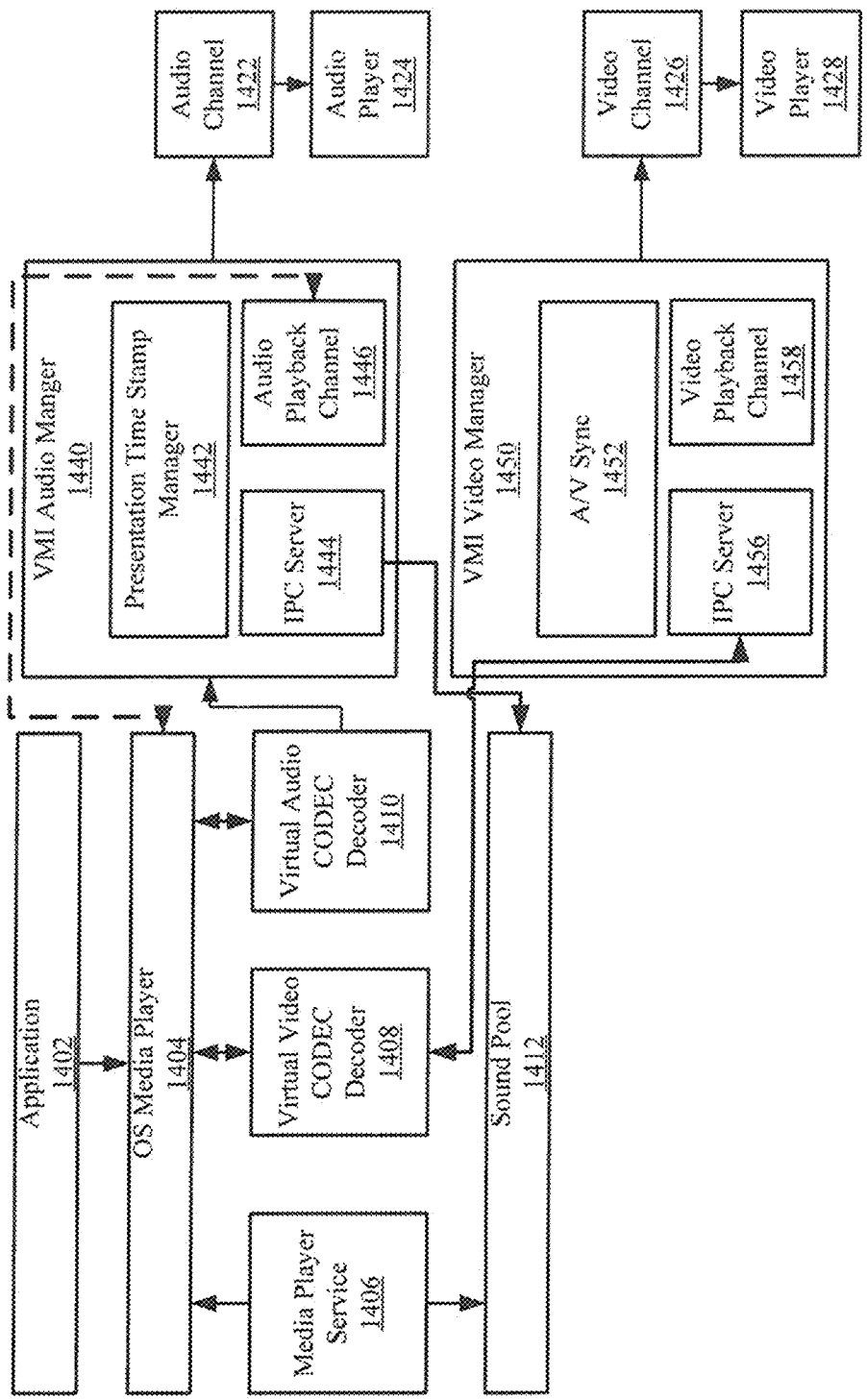
FIG. 14 shows example audio and video processing in accordance with various embodiments of the present invention.

FIG. 14 shows example audio and video processing in accordance with various embodiments. FIG. 14 depicts an audio and video processing architecture 1400 for playback of audio and video from a remotely executing application to a client for output.

In a mobile device, audio and video can be decoded and played back using dedicated decoders. Supported applications can range from games using the OGG multimedia framework to applications, e.g., YouTube, that uses H.264 for Video and MP3 for Audio. Applications that use audio and video can use a varying range of codecs, e.g., H.264, H265, YP8/9, MP3, OGG, etc. The client application (e.g., VMI client 850), based on the capability and preferences of the client device (e.g., device 302), will export the list of supported formats during the initial channel creation. Virtual audio and video codecs are registered to handle the decoding of supported media in the operating system (e.g., Android) server.

The application 1402 is an application that is executing on a server and can be any application that outputs video or audio, e.g., a web browser, YouTube. The application 1402 sends instructions to output video and/or audio data, e.g., compressed video and audio data to the OS media player 1404. The OS media player 1404 determines the appropriate resources that are to be used to play the video and/or audio and sends the video and/or audio data to a media player service 1406, a virtual video CODEC decoder 1408, and a virtual audio CODEC decoder 1410.

The media player service 1406 can be a media player service (e.g., media player service 604) of an operating system that is configured to access OS components and send API calls to the virtual video CODEC decoder 1408 and the virtual audio CODEC decoder 1410.

The virtual video CODEC decoder 1408 can be virtual video device (e.g., virtual video device 342a or OMX layer). The virtual audio CODEC decoder 1410 can be a virtual audio device (e.g., virtual audio device 344a or OMX layer). The virtual video CODEC decoder 1408 sends encoded video data to the VMI video manager 1450.

The VMI video manager 1450 includes an audio/video (A/V) synchronization module 1452, an IPC server 1456, and a video playback channel 1458. The audio/video (A/V) synchronization module 1452 is configured to synchronize the output of video and audio data sent via the video playback channel 1458 and the audio playback channel 1446. The IPC server 1456 is configured to receive encoded video data from the virtual video CODEC 1408. The video playback channel 1458 is configured to send encoded video data to a video channel 1426 of a client device (e.g., the device 302). The client device then sends the encoded video data to a client media player 1428 for output by the client device.

The virtual audio CODEC decoder 1410 sends encoded audio data to a VMI audio manager 1440. The VMI audio manager 1440 includes a presentation time stamp manager 1442, an IPC server 1444, and an audio playback channel 1446. The presentation time stamp manager 1442 is configured to determine time stamps for sending the encoded audio data via the audio playback channel 1446. The IPC server 1444 is configured to output encoded audio to a sound pool 1412. The sound pool 1412 is configured to manage and play pre-loaded audio resources for applications.

The audio playback channel 1446 is configured to send encoded audio data to an audio channel 1422 of a client device (e.g., the device 302). The client device then sends the encoded audio data to a client audio player 1424 for output by the client device.

In some embodiments, the virtual CODECs 1408-1410 re-direct data traffic to the VMI channels based on the session ID of the mobile application 1402 that is requesting the media player service 1406. The encoded data is sent to the client app using Audio, Video channel. The encoded data can be sent with appropriate information, e.g., presentation time stamp, Audio to Video Synchronization (AVSync) delay, the client application will play back the data using the codec present on the client device. In some cases, the client may need to blend and overlay the display and video information for displaying information, e.g., play, pause and other media player control information which are to be displayed to enable user to control video playback. The multimedia content re-direction is configured to handle other control information, e.g., start of media playback, pause and other issues like waiting for the network stream to resume to ensure the media is played back properly.

FIGS. 15A-C show example notification processing in accordance with various embodiments. FIG. 15A depicts a computer controlled process 1500 of creating a notification channel and sending notifications to a client. The blocks 1508 and 1514 can be performed by the client application (e.g., VMI client 850). The blocks 1502-1512 can be performed by a server executing a multi-user mobile operating system, as described herein.

At block 1502, the notification channel is enabled for a user session. The notification channel can be enabled during the login process (e.g., the process 700).

At block 1504, the notification listener service is enabled for the user associated with the user session. The notification listener service (e.g., notification service 626) can be part of the operating system.

At block 1506, the notification channel is created. The virtual notification channel can be created during the user login process. The virtual notification channel can be configured to transmit notifications generated during the user session from multiple different applications.

At block 1508, the notification channel is opened, e.g., with the client application (e.g., VMI client 850). During normal operation, e.g., as a new notification is generated by a remote mobile application, the notifications are delivered to the client application via the virtual notification channel. In some embodiments, the virtual notification channel directly interfaces with the NotificationManager of an Android server operating system to collect notifications.

At block 1510, a check is performed for any pending notifications. For example, there can be pending notifications from background processes and system notifications which are to be delivered as soon as the user session is created.

At block 1512, any pending notifications are sent. The pending notifications can be sent through the notification channel.

At block 1514, the notifications are posted to the client. The notifications are received by the client and can be displayed to a user.

FIG. 15B depicts a computer controlled process 1520 of sending a notification from a remotely executing application to an associated client. The block 1528 can be performed by the client application (e.g., VMI client 850). The blocks 1522-1526 can be performed by a server executing a multi-user mobile operating system, as described herein.

At block 1522, an application sends a notification to an operating system. The application can be an application that is executing remotely on a multi-user mobile operating system, as described herein in accordance with the mobile app virtualization architecture. The notification can be any notification, e.g., an email notification, a voicemail notification, a text message notification, an LED illumination, etc.

At block 1524, the notification is sent from the operating system. The notification can be sent from the operating system to the notification channel. In some embodiments, the notification channel receives notifications from one or more executing applications and the operating system.

At block 1526, the notification is sent as a notify update message. The notification can be encoded and/or compressed for transmission via the notification update channel.

At block 1528, the notification is posted on the client application (e.g., VMI client 850). The notification can then be displayed to a user.

FIG. 15C depicts a computer controlled process 1540 for clearing a notification. The block 1550 can be performed by the client application (e.g., VMI client 850). The blocks 1552-1560 can be performed by a server executing a multi-user mobile operating system, as described herein.

At block 1550, a clear notification indicator is sent. The clear notification indicator can be created in response to a user selecting clear on a displayed notification. The clear notification indicator can be sent to the VMI network service (e.g., VMI network service 830).

At block 1552, the clear notification indicator is sent to the notification channel. In some embodiments, the clear notification indicator decoded and/or decompressed to a clear notification event.

At block 1554, the clear notification event is sent. The clear notification event can be sent from the notification channel.

At block 1556, a cancel notification message is sent to the notification listener service. The notification listener service can be part of a multi-user mobile operating system. The notification listener service can then cancel the notification associated with the cancel notification message.

At block 1558, a notification removed event is sent. The notification removed event can be sent from the notification listener service to a VMI network service (e.g., VMI network service 830).

At block 1560, the notification is removed from the VMI network service so that the notification is no longer sent to the client (e.g., VMI client 850).

Figure 16:
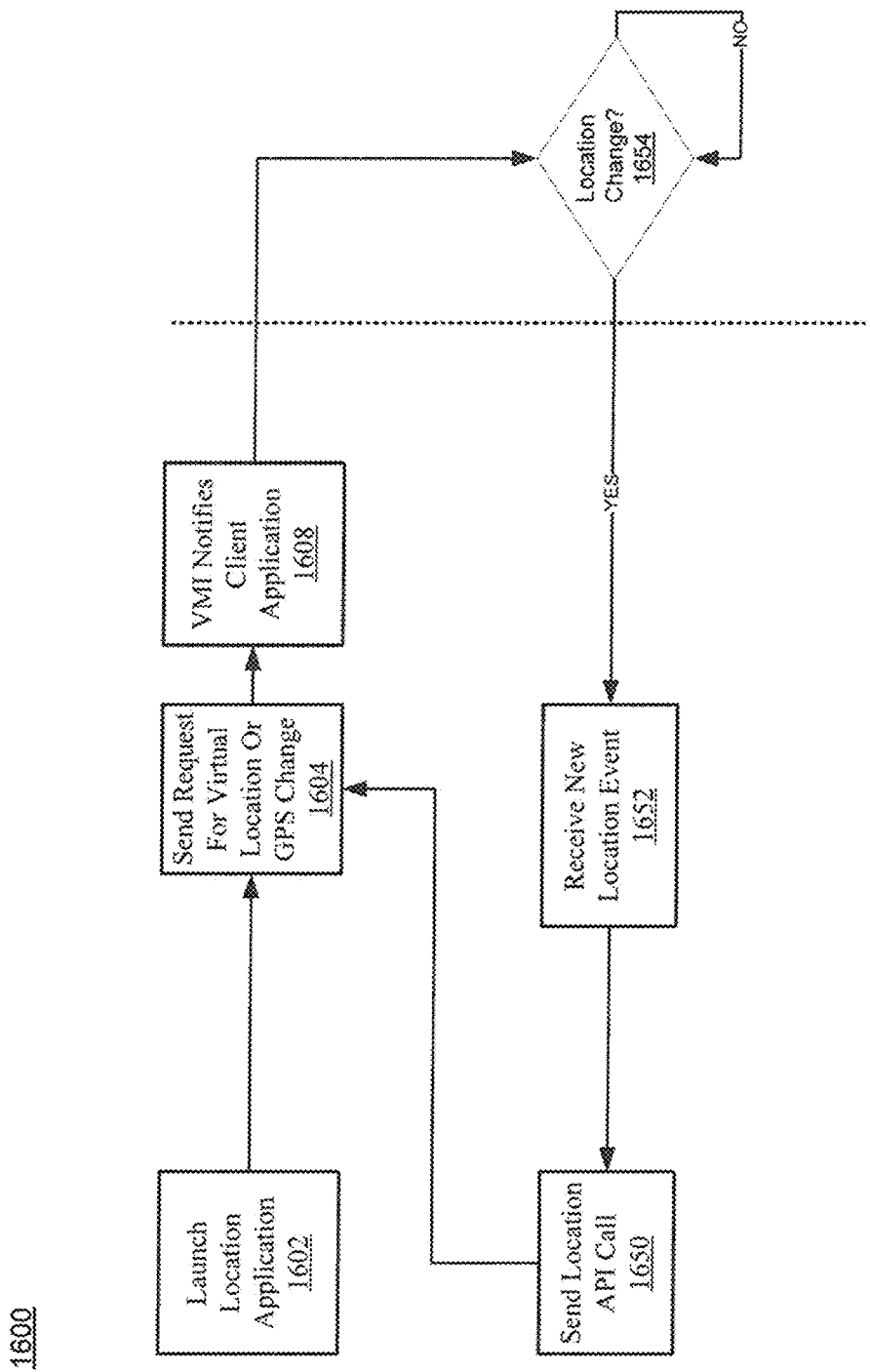
FIG. 16 shows example location data processing in accordance with various embodiments of the present invention.

FIG. 16 shows example location data processing in accordance with various embodiments. FIG. 16 depicts a computer controller process 1600 for updating a remotely executing application of location events. The block 1654 can be performed by a client application (e.g., VMI client 850). The blocks 1602-1608 and 150-1652 can be performed by a server executing a multi-user mobile operating system, as described herein.

At block 1602, a location application is launched. The location application could be a navigation application, a maps application, a shopping application, a business review application, a search application or any application that can use location information.

At block 1604, the location application requests a virtual location or GPS change. In some embodiments, the location application sends a query to the operating system location service (e.g., location service 616).

At block 1606, the VMI notifies the client application of the location request. The VMI can receive a location query at virtual location device (e.g., virtual location device 350*a*) and send a request to the client application to send a notification upon a location change.

At block 1654, whether a location change has occurred is determined. The client application can monitor the local GPS or other location hardware for a location change. If a location change is determined, block 1652 is performed and a new location event is sent. If no location change is determined, block 1654 is performed.

At block 1652, a new location event is received. The new location event can be received at a virtual location device associated with name space that is associated with the location application.

At block 1650, a location API call is sent to the location application. The location service of the operating system can send an API call to the location application with the new location event.

In some embodiments, the client application opens the location channel if the client device has a usable GPS or other device that can provide location data. Once the user launches a mobile application, e.g., maps, that requests the location via Location API, e.g., LocationListner, GpsStatus, the Location Start request is encoded with the associated criterion, e.g., resolution, is sent to the client application. The client application encodes and transmits location data as when available via the location channel. The data arriving in the location channel is encoded and injected to the application via the virtual location device mapped to the Android Location APIs of the session.

Figure 17:
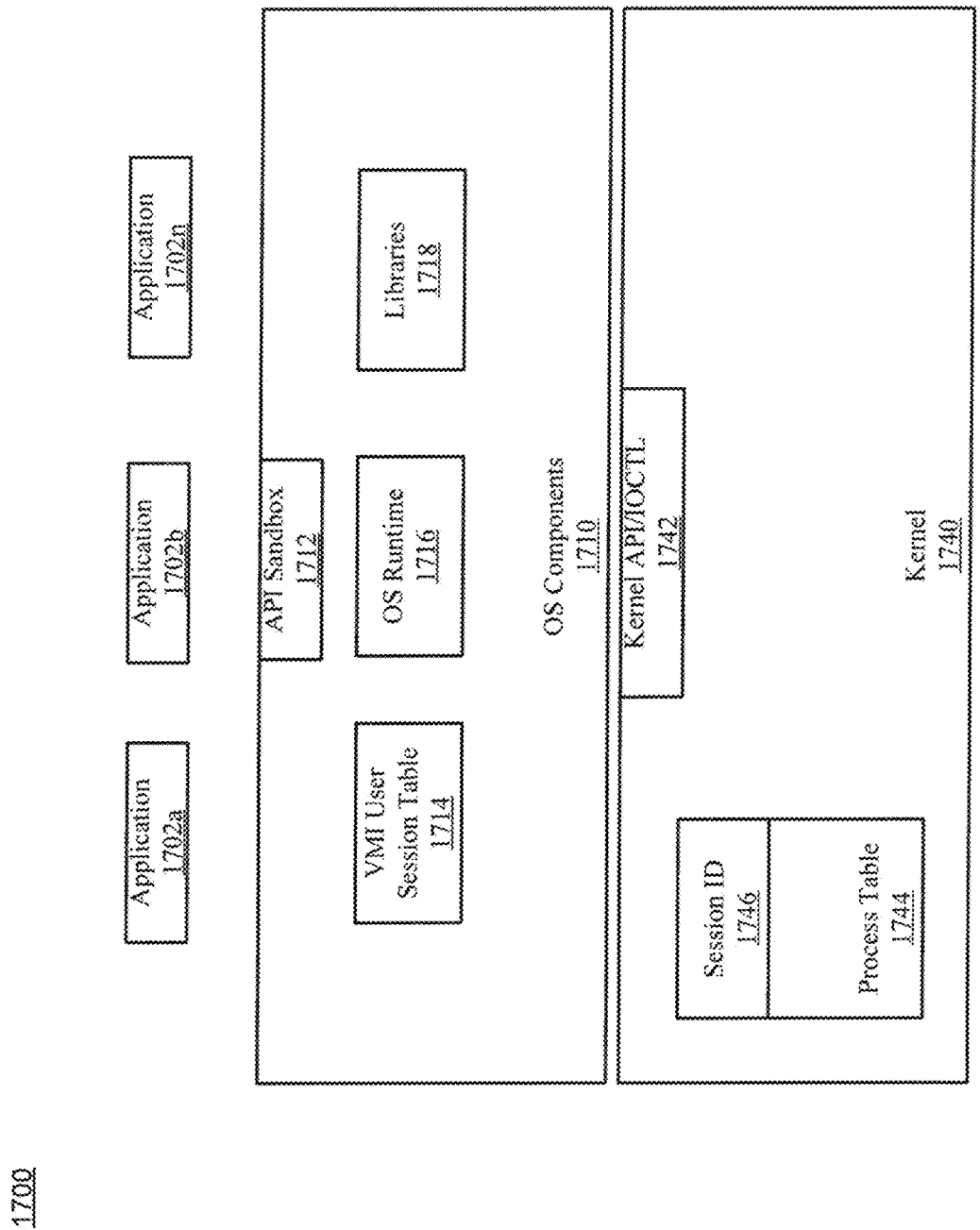
FIG. 17 shows example components of an operating system in accordance with various embodiments of the present invention.

FIG. 17 shows example components of an operating system in accordance with various embodiments of the mobile app virtualization architecture. FIG. 17 and the description that follows provide further details regarding the manner in which applications of a user session (e.g., session 360*a* of FIG. 3) can be mapped to or paired with a VMI session (e.g., VMI 632*a* of FIG. 3) without requiring modification of the application program. FIG. 17 depicts applications 1702*a*-*n* executing on top of single operating system 1700 including OS components 1710 and a kernel 1740. The operating system 1700 is a multi-user mobile operating system, as described herein. The operating system 1700 can include more components other than the OS components 1710 and kernel 1740 shown.

The applications 1702*a*-*n* can be unmodified mobile applications executing on top of the operating system 1700. APIs calls are sent between (e.g., to and from) the applications 1702*a*-*n* and the operating system 1700.

The OS components 1710 include an API sandbox 1712, a VMI user session table 1714, an OS runtime 1716, and libraries 1718. It is appreciated that the API sandbox 1712 is configured to receive or capture API calls from the applications 1702*a*-*n*. The VMI user session table 1714 includes a mapping of sessions and associated virtual devices.

The OS runtime 1716 is configured for receiving one or more requests (e.g., API calls) from applications for functions that support the execution of an application. The libraries 1718 can be various system libraries, e.g., Bionic LibC, GLES, SSL, etc., configured to carry out, modify, and/or transmit API calls.

The kernel 1740 includes kernel APP/IOCTL (input/output control) 1742 and process table 1744. The kernel APP/IOCTL 1742 is configured to receive API calls and control I/O. The process table 1744 includes process information for each of applications 1702*a*-*n* and a session ID portion 1746. The process table 1744 can include a process ID, a list of open files, memory being used, and a list of pipes, for each process. It is appreciated that the process table 1744 further includes a mapping of each process and an associated session ID.

In some embodiments, the API sandbox 1712 provides information on the application that originated an API call. It is appreciated that the kernel 1740 inserts the session ID or namespace into an API call based on the process table 1744. In accordance with embodiments of the present invention, the modified API call can then be sent to the appropriate virtual device associated with the same session ID or namespace.

In some embodiments, the process table 1744 and libraries 1718 (e.g., base system libraries) are extended to provide session-id information for each process to enable universal availability of session ID mapping. The session mapping can be used by various other components, e.g., zygote, while launching the process, and GLES for providing the display memory mapped to the process, as well as by other components. The session information can also be used to enforce security policy in the system, ensuring that data does not leak between sessions. File system can also use session information to make sure only the files nodes mapped to the session are available for the applications running within the session. Even if the application escalates its privilege to super user at run time, it will still be limited to the policies configured for the session.

FIGS. 18A-B show example suspend and resume functionality in accordance with various embodiments. In some embodiments, the VMI session can enter suspend state for a few reasons, such as a drop in network connection, a user switching from one network to other, or an end user deciding to put the session in suspend state for future resumption. When the server detects an abrupt stop in connection or explicit request for suspend, it will put the session in SUSPEND state. The applications running in the session will behave as though the device (e.g., phone) display has been turned off and the device has entered in suspend state. For example, mobile applications registered for SCREEN_OFF/SCREEN_ON events will be notified with an OFF EVENT when the session enters suspend mode. It allows the user to continue using the application without disruption when the session is suspended and resumed. When the session resumes, pending data, e.g., notifications, will be delivered right after the session is resumed. The data is queued in the virtual devices associated with the session while the session is in suspend mode and delivered once the session resumes.

FIG. 18A depicts a computer controlled process 1800 for suspending an application remotely executing on a server. The block 1802 can be performed by a client (e.g., VMI client 850). The blocks 1804-1810 can be performed by a server.

At block 1802, a suspend message is sent. The suspend message can be sent from the launcher application, as described herein, in response to a user selecting a suspend item or button.

At block 1804, a connection failure indicator is sent. The connection failure may be determined based on the detection of a failure of a network connection. For example, if a client device (e.g., device 302) is on a train and the network connection fails, a connection failure can be determined. In some embodiment, the connection failure may be determine by a VMI network service (e.g., VMI network service 830).

At block 1806, a suspend notification is sent. In some embodiments, the suspend notification is sent from the VMI network service to the VMI server.

At block 1808, virtual devices are suspended. The VMI server can signal the virtual devices associated with a session to enter a suspend state.

At block 1810, suspend notifications are sent to the applications. The VMI server can send suspend notifications to the applications executing on the server. The suspend notifications to the applications can be a screen off event.

FIG. 18B depicts a computer controlled process 1840 for resuming remote execution of an application on a server. The block 1850 can be performed by a client application (e.g., VMI client 850). The blocks 1852-1862 can be performed by a server.

At block 1850, a resume command is sent. The resume command can be sent from the client application (e.g., the launcher).

At block 1852, authentication is performed. The authentication can be performed to verify user credentials to ensure that the session is not resumed by someone else.

At block 1854, whether there are any pending events is determined. The pending events may be notifications, e.g., as described with respect to FIGS. 15A-C. If there are pending events, block 1862 is performed.

At block 1856, wake up commands are sent to virtual devices. The wake up command can signal the virtual devices to accept input events and process events (e.g., data communication events).

At block 1858, wake up commands are sent to the applications. The wake up commands signal the applications to resume executing.

At block 1860, data is sent to the client. The data may be data sent from the virtual devices that are now awake in response to the wake up commands.

Example Computer System Environment

Figure 19:
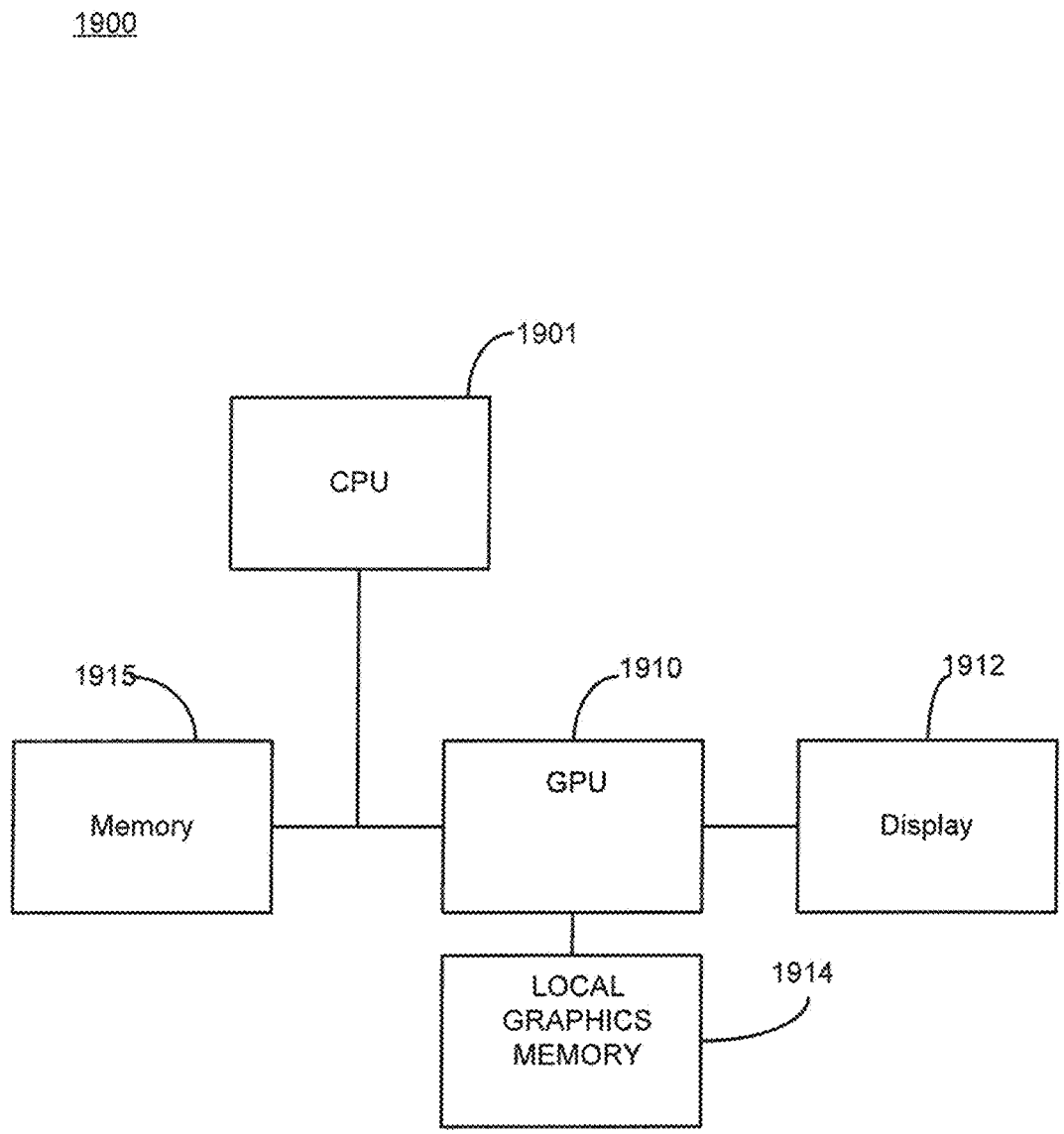
FIG. 19 shows an example computer system in accordance with various embodiments of the present invention.

FIG. 19 shows a computer system 1900 in accordance with one embodiment of the present invention. Computer system 1900 depicts the components of a basic computer system in accordance with embodiments of the present invention providing the execution platform for certain hardware-based and software-based functionality. The basic computer 1900 could function as a platform for either the server or the client devices described herein. In general, computer system 1900 comprises at least one CPU 1901, a system memory 1915, and may include at least one graphics processor unit (GPU) 1910. The CPU 1901 can be coupled to the system memory 1915 via a bridge component/memory controller (not shown) or can be directly coupled to the system memory 1915 via a memory controller (not shown) internal to the CPU 1901. The GPU 1910 may be coupled to a display 1912. One or more additional GPUs can optionally be coupled to system 1900 to further increase its computational power. The GPU(s) 1910 is coupled to the CPU 1901 and the system memory 1915. The GPU 1910 can be implemented as a discrete component, a discrete graphics card designed to couple to the computer system 1900 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 1914 may be included for the GPU 1910 for high bandwidth graphics data storage. The computer system 1900 may be coupled to a radar system 1960, as described herein.

The CPU 1901 and the GPU 1910 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 1910 can also be implemented in, and performed by, a suitably equipped CPU 1901. Additionally, while embodiments herein may make reference to a GPU, it should be noted that the described circuits and/or functionality can also be implemented and other types of processors (e.g., general purpose or other special-purpose coprocessors) or within a CPU.

System 1900 can be implemented as, for example, a desktop computer system or server computer system having a powerful general-purpose CPU 1901 coupled to a dedicated graphics rendering GPU 1910. In such an embodiment, components can be included that add peripheral buses, specialized audio/video components, IO devices, and the like. Similarly, system 1900 can be implemented as vehicle dashboard component, a handheld device (e.g., cellphone, etc.), direct broadcast satellite (DBS)/terrestrial set-top box or a set-top video game console device. System 1900 can also be implemented as a "system on a chip", where the electronics (e.g., the components 1901, 1915, 1910, 1914, and the like) of a computing device are wholly contained within a single integrated circuit die. Examples include a hand-held instrument with a display, a car navigation system, a portable entertainment system, and the like.

In one exemplary embodiment, GPU 1910 is operable for general-purpose computing on graphics processing units (GPGPU) computing. General-purpose computing on graphics processing units (GPGPU) programs or applications may be designed or written with the Compute Unified Device Architecture (CUDA) framework and Open Computing Language (OpenCL) framework. GPU 1910 may execute Compute Unified Device Architecture (CUDA) programs and Open Computing Language (OpenCL) programs. It is appreciated that the parallel architecture of GPU 1910 may have significant performance advantages over CPU 1901.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A server based architecture for mobile application virtualization, said architecture comprising:
a single operating system instantiation resident on a server computer system, said single operating system comprising a session management module and a plurality of service modules;
a plurality of user sessions, each user session of said plurality of user sessions comprising a respective plurality of applications and a unique respective session ID, wherein said each user session calls a service module of said plurality of service modules of said single operating system; and
a plurality of virtual device sets, wherein each respective virtual device set of said plurality of virtual device sets is mapped by said session management module to a respective user session of said plurality of user sessions by matching a session ID of said respective virtual device set and said respective session ID for said each user session, and wherein there is a one-to-one mapping between said user sessions and said virtual device sets to form unique pairs of said user sessions and said virtual device sets;
wherein, upon receiving an application programming interface (API) call from an application of a first user session of said plurality of user sessions to a first service module of said plurality of service modules, said single operating system maps said API call to a first virtual device set of said plurality of virtual device sets having a session ID that matches a session ID of said first user session, for fulfillment of said API call by said first service module.

2. The architecture of claim 1 wherein said each user session, and its paired virtual device set, are associated with a respective remote mobile computing system for enabling a virtualized computing experience thereon.

3. The architecture of claim 2 further comprising a communication gateway for routing information to and from said plurality of user sessions with respect to associated remote mobile computer systems.

4. The architecture of claim 1 wherein said session management module comprises a mapping of said each user session with a respective virtual device set associated therewith and wherein further said mapping is based on session IDs.

5. The architecture of claim 4 wherein said session management module is further operable to route information from said first virtual device set to said first user session based on said session ID of said first virtual device set.

6. The architecture of claim 1 wherein said single operating system comprises a module for:
receiving said API call;
modifying said API call to include said session ID of said first user session to create a modified API call comprising said session ID of said first user session; and
forwarding said modified API call to said first service module.

7. The architecture of claim 6 wherein said session management module determines said first virtual device set based on said session ID of said modified API call.

8. A server based architecture for mobile application virtualization, said architecture comprising:
a single operating system instantiation resident on a server computer system, said single operating system comprising a session management module and a plurality of service modules;
a plurality of user sessions, each user session of said plurality of user sessions comprising a respective plurality of applications and a unique respective session ID, wherein said each user session calls a service module of said plurality of service modules of said single operating system;
a plurality of virtual device sets, wherein each respective virtual device set of said plurality of virtual device sets is mapped by said session management module to a respective user session of said plurality of users sessions by matching a session ID of said respective virtual device set and said respective session ID for said each user session, and wherein there is a one-to-one mapping between said user sessions and said virtual device sets to form unique pairs of said user sessions and said virtual device sets; and
an operating system service associated with said single operating system;
wherein, upon receiving a request from a network, said request from an application of a first user session of said plurality of user sessions and to a first service module of said plurality of service modules, said operating system service sends said request to a virtual device of a first virtual device set of said plurality of virtual device sets having a session ID that matches a session ID of said first user session associated with said request.

9. The architecture of claim 8 wherein said each user session, and its paired virtual device set, are associated with a respective remote mobile computing system for enabling a virtualized computing experience thereon.

10. The architecture of claim 9 further comprising a communication gateway for routing information to and from said plurality of user sessions with respect to associated remote mobile computer systems.

11. The architecture of claim 8 wherein said session management module comprises a mapping of said each user session with a respective virtual device set associated therewith and wherein further said mapping is based on session IDs.

12. The architecture of claim 11 wherein said session management module is further operable to route information from said first virtual device set to said first user session based on said session ID of said first virtual device set.

13. The architecture of claim 8 wherein said request comprises an API call, wherein said single operating system comprises a module for:
　modifying said API call to include said session ID of said first user session to create a modified API call comprising said session ID of said first user session; and
　forwarding said modified API call to said first service module.

14. The architecture of claim 13 wherein said session management module determines said first virtual device set based on said session ID of said modified API call.

15. A system comprising:
　a session management module configured to create a plurality of user sessions for supporting a plurality of remote mobile devices, wherein each user session of said plurality of user sessions comprises a respective plurality of applications and a unique respective session ID, and wherein said session management module is further configured to allocate server resources to said each user session;
　a virtual device module configured to create a plurality of virtual device sets, wherein each respective virtual device set of said plurality of virtual device sets is mapped to a respective user session of said plurality of user sessions by said session management module matching a session ID of said respective virtual device set and said respective session ID for said each user session, and wherein there is a one-to-one mapping between said user sessions and said virtual device sets to form unique pairs of said user sessions and said virtual device sets;
　a launcher module configured to launch an application of said plurality of applications, wherein said application executes within a user session of said plurality of user sessions; and
　a service module configured to receive a request from said application, wherein said service module is further configured to send said request to a virtual device of said plurality of virtual device sets that has a session ID that matches a session ID of said user session, wherein a single operating system instantiation comprises said service module and said session management module, and wherein said service module is configured to route requests between said plurality of applications and said plurality of virtual device sets based on matching session IDs.

16. The system as described in claim 15, wherein said request is an application programming interface (API) call, wherein said operating system comprises a module for:
　modifying said API call to include said session ID of said user session to create a modified API call comprising said session ID of said user session; and
　forwarding said modified API call to said service module.

17. The system as described in claim 15, wherein said virtual device comprises a parameter associated with a physical device.

18. The system as described in claim 15, wherein said virtual device comprises an inter-process communication (IPC) pipe.

* * * * *